United States Patent [19]
Kusumoto

[11] Patent Number: 6,088,135
[45] Date of Patent: Jul. 11, 2000

[54] IMAGE READING APPARATUS

[75] Inventor: Keiji Kusumoto, Toyokawa, Japan

[73] Assignee: Minolta Co., Ltd., Osaka, Japan

[21] Appl. No.: 08/947,908

[22] Filed: Oct. 9, 1997

[30] Foreign Application Priority Data

Mar. 11, 1997 [JP] Japan .................................. 9-056291
Mar. 11, 1997 [JP] Japan .................................. 9-056292

[51] Int. Cl.[7] .................................................. H04N 1/04
[52] U.S. Cl. ........................ 358/498; 358/496; 358/497
[58] Field of Search .................................. 399/374, 388, 399/364; 358/496, 497, 498

[56] References Cited

U.S. PATENT DOCUMENTS

| | | | |
|---|---|---|---|
| 5,177,546 | 1/1993 | Tsubo ........................................ | 355/314 |
| 5,206,735 | 4/1993 | Gauronski et al. . | |
| 5,481,354 | 1/1996 | Nakajima ................................ | 355/324 |
| 5,534,973 | 7/1996 | Harada .................................... | 355/202 |
| 5,708,953 | 1/1998 | Morigami et al. ..................... | 399/364 |
| 5,745,253 | 4/1998 | Muramatsu et al. .................... | 358/408 |

FOREIGN PATENT DOCUMENTS 05136918  1/1993  Japan .

*Primary Examiner*—Kimberly A. Williams
*Assistant Examiner*—Derrick Fields
*Attorney, Agent, or Firm*—McDermott, Will & Emery

[57] ABSTRACT

During the time period since a document placed at a multi-document tray is transported by a roller pair and has its images on the front surface read until the roller pair is reversed to start reading the back surface of the document, a document placed at a single feed tray is transported by another roller pair for interrupt reading of the document. The interrupt reading can be achieved without interrupting the transportation of the current document and replacing the document.

11 Claims, 38 Drawing Sheets

READING FRONT SURFACE

READING BACK SURFACE

DOCUMENT OUTPUT
PAGE COLLATING

MANAGEMENT TABLE MT1

| AREA | PAGE NO. PN | FORWARD CONCATENATION | REARWARD CONCATENATION | ADDITIONAL INFORMATION |
|------|-------------|------------------------|-------------------------|------------------------|
| 00 | 1 | 00 | 01 | |
| 01 | 1 | 01 | FF | |
| 02 | 2 | 00 | 03 | |
| 03 | 2 | 03 | FF | |
| ⋮ | | | | |

CODE MEMORY 35

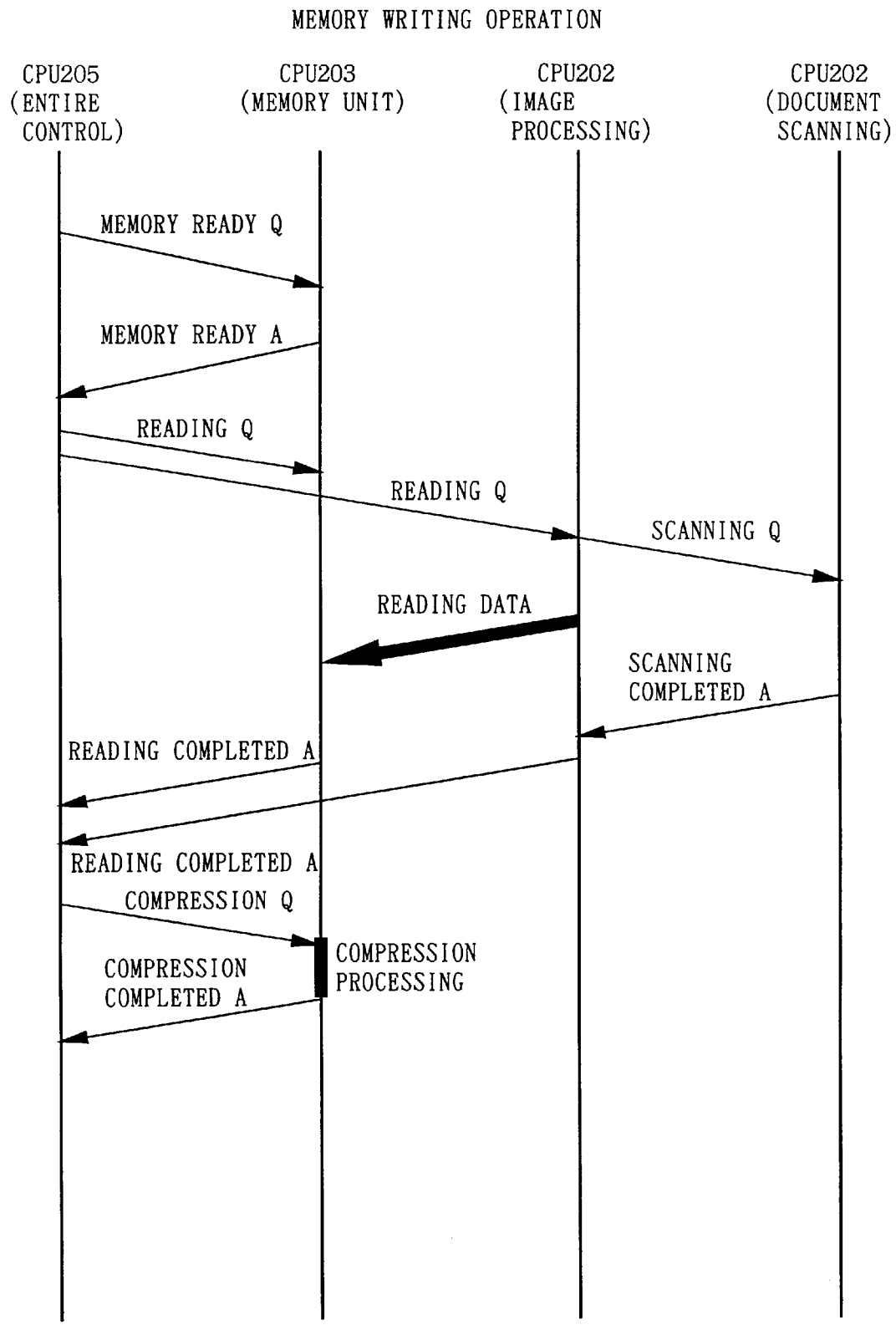

READING FRONT SURFACE

READING BACK SURFACE

DUCUMENT OUTPUT
PAGE COLLATING

IMAGE READING APPARATUS

BACKGROUND OF THE INVENTION

1. Field of the Invention

The present invention relates generally to image reading apparatuses for reading document images, and more particularly, to an image reading apparatus for use in an image forming apparatus such as copying machine, facsimile, printer and combined machine thereof for reproducing document images on a recording medium.

2. Description of the Related Art

There has been known as an image forming apparatus, an apparatus which transports a document by an automatic document feeder, makes it rest on a platen glass and optically scan the document by a scanner to read images on the document. In such an apparatus, the document sheet whose images have been read is removed from the platen glass, and the next document sheet is set on the platen glass and optically scanned by the scanner. The conventional apparatus which can execute one job while another job is being executed. For example, an interruption instruction is given on the panel to temporarily stop a job currently going on and another job is processed.

As another conventional image forming apparatus, there has been known a combined machine of a copying machine and a facsimile (or printer) which can previously set printing priority order to the copying machine function and facsimile function, and controls its operation according to the set order of priority.

SUMMARY OF THE INVENTION

It is an object of the invention to provide an image reading apparatus capable of processing one job while processing another job including a plurality of document sheets.

Another object of the invention is to provide an image reading apparatus capable of processing a job while processing another job including a plurality of document sheets without lowering the efficiency of processing that another job.

Further, yet another object of the invention is to provide an easier-to-handle image forming apparatus including an automatic document feeder which has a switch back path as a document reversing path.

Furthermore, a still another object of the invention is to provide an easier-to-handle image forming apparatus including an automatic document feeder which has a switch back path as a document reversing path for reading the images of a document while transporting the document.

In order to achieve the above-described objects, an image reading apparatus according to one aspect of the invention includes a first setting portion on which a first document and a second document are set, a second setting portion on which a third document is set, and an image reading unit for feeding and reading the first and second documents sequentially and for reading the third document. The image reading unit requires a first time period between the completion of reading the first document and the start of reading the second document, and the image reading unit requires a second time period for reading the third document. The apparatus also includes a, controller which controls the image reading unit to read the third document between the completion of reading the first document and the start of reading the second document in a case where the first period is longer than the second period.

An image reading apparatus according to another aspect of the invention includes an image reading unit for reading an image of a document, a first unit for accomplishing a first job for reading a series of first documents sequentially by using the image reading unit, a second unit for accomplishing a second job for reading a second document by using image reading unit, and a controlling unit for controlling the first unit and the second unit to accomplish the second job during the first job in a case where the image reading of the second document can be accomplished without stopping the sequential image reading of the first documents.

According to yet another aspect of the invention, an image reading apparatus includes an image reading unit for reading an image of a document including a converter which converts an image of a document into a digital signal, and a feeder which feeds a first document along a feeding path. The feeding path includes a first position at which the first document is read and converted into a digital signal by the converter of the image reading unit. At a second position which is out of the feeding path, a second document is read and converted into a digital signal by the converter of the image reading unit. The image reading apparatus also includes a controller for selectively position the image reading unit at one of the first and second positions.

An image reading apparatus according to an additional aspect of the invention includes a first setting portion on which a first document and a second document are set, a feeder for feeding the first document and the second document along a feeding path sequentially, a second setting portion which is out of the feeding path on which a third document is set, and an image reading unit for reading the first and second documents fed by the feeder, and for reading the third document. Setting of the third document to the second setting portion is achievable during the feeding operation of the first document and the second document.

An image reading apparatus according to another additional aspect of the invention includes a document holding unit for holding first documents and a second document, an image reading means for reading an image of a document at a predetermined position and, a feeding unit including a feeding path and a reversing path for feeding and reversing a series of documents sequentially so that both sides of each of the first documents are moved over the predetermined position. The image reading unit reads the image of each second document by moving the respective one of the second documents over the predetermined position. The image reading apparatus also includes a controlling unit for controlling the feeding unit and image reading unit to execute a first job for reading the images of the first documents sequentially, and to permit interpose of a job for reading the image of the second document during the execution of the first job.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows a schematic sequence of a memory writing operation;

DESCRIPTION OF THE PREFERRED EMBODIMENTS

First Embodiment

Figure 1:
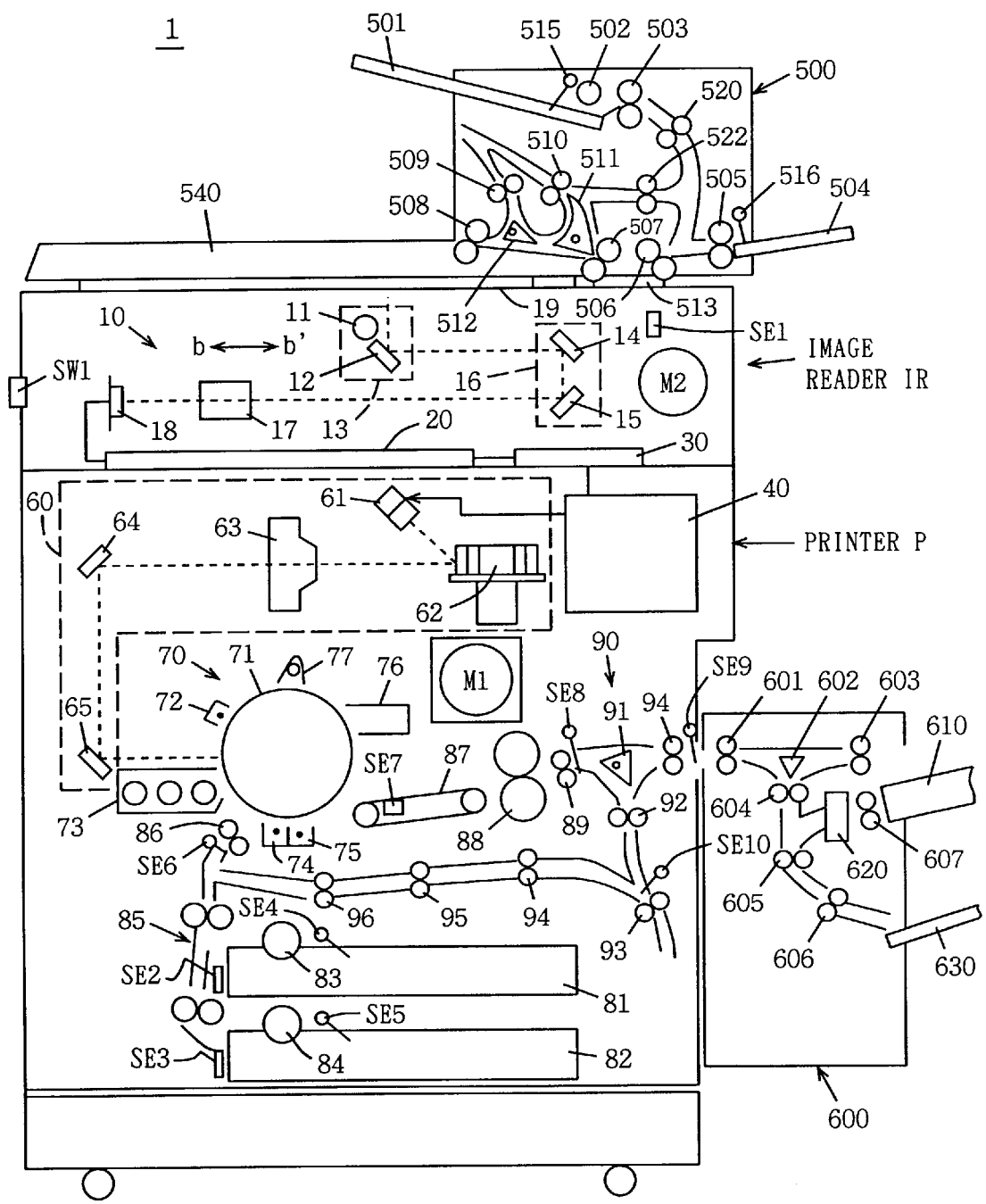
FIG. 1 is a cross sectional view showing the structure of a copying machine according to a first embodiment of the invention.
Figure 2:
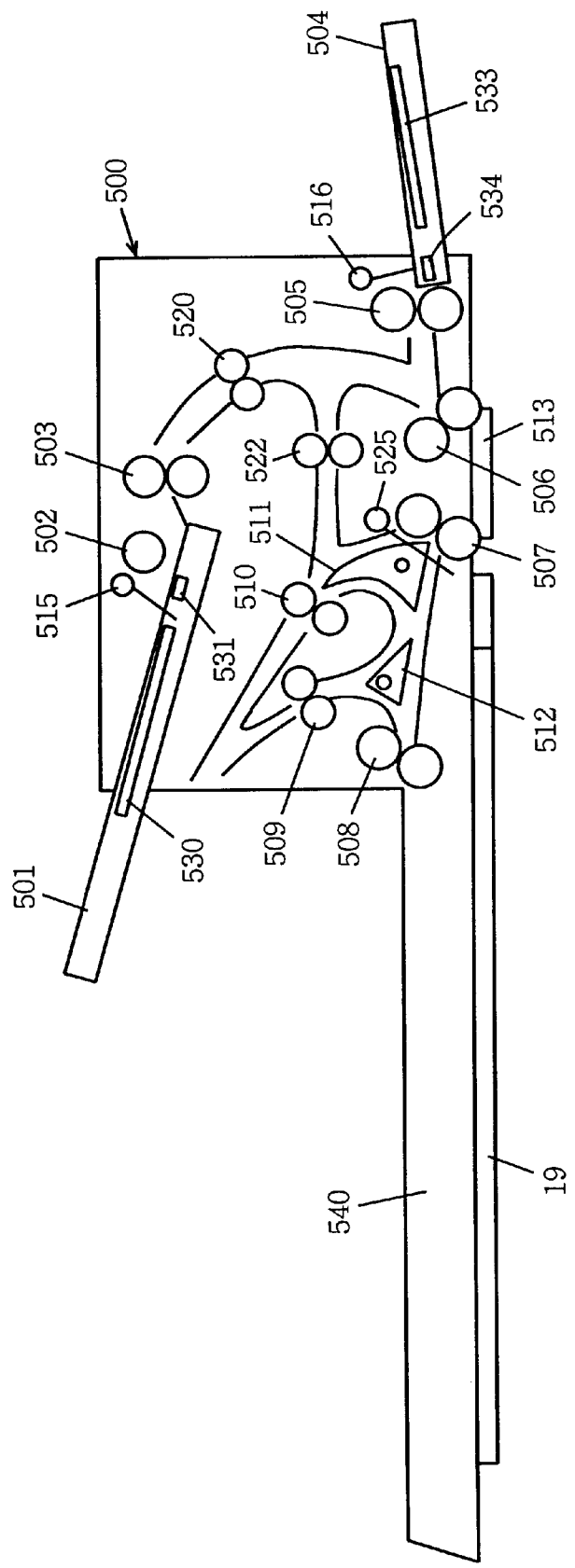
FIG. 2 is a cross sectional view showing the structure of a document transport unit in the copying machine shown in FIG. 1.

FIG. 1 is a cross sectional view showing the structure of a digital copying machine 1 according to a first embodiment of the invention, and FIG. 2 is a cross sectional view showing the structure of a document transport unit 500 shown in FIG. 1.

In FIG. 1, copying machine 1 includes a scanning system 10 for converting a read document into an image signal, an image processing unit 20 for processing the image signal sent from scanning system 10, a memory unit 30 for storing image data output from image processing unit 20, a printing processing unit 40 for driving a semiconductor laser (LD) 61 based on image data output from memory unit 30, a laser optical system 60 for guiding a laser beam from semiconductor laser 61 to an exposure position on a photoreceptor drum 71, an image forming system 70 for developing a latent image by the laser beam and forming an image on a recording paper sheet, an operation panel (not shown in FIG. 1) provided on the top of copying machine main body, a document transport unit 500 transporting a document and reversing the front and back surfaces of a document sheet if necessary, and a finisher 600 for automating processings such as sorting and stapling. Scanning system 10, image processing unit 20 and the like form an image reader IR and printing processing unit 40, laser optical system 60, image forming system 70 and the like form a printer P. Note that a switch SW1 in FIG. 1 is used to supply electric power to digital copying machine 1.

Image reader IR reads the image of a document sheet placed between a platen glass 19 and a document cover 540 or the image of a document transported by document transport unit 500, and produces image data corresponding to each pixel of the image of the document. If the image of a document sheet placed between platen glass 19 and document cover 540 is to be read, a first scanner 13 having an exposure lamp 11 and a first mirror 12, and a second scanner 16 having second and third mirrors 14 and 15 are driven in the direction indicated by arrows b and b' (the vertical scanning direction) to vertically scan the document image. If the image of a document sheet transported by document transport unit 500 is to be read, first and second scanners 13 and 16 are moved in the direction indicated by arrow b' and the first scanner 13 is fixed under platen glass 513 below document transport unit 500, and the document sheet is transported, so that the image of the document is vertically scanned.

Light from exposure lamp 11 is reflected by the document sheet on document glass 19, and directed to a line sensor (CCD) 18 through mirrors 12, 14 and 15, and a lens 17. Line sensor 18 is formed of an arrangement of a plurality of photoelectric conversion elements in the direction perpendicular to the surface of the sheet of FIG. 1 (the horizontal scanning direction), reads an image at 400 DPI, and outputs image data corresponding to each pixel. Note that sensor SE1 is used to detect first scanner 13 being in a home position.

Image data output from line sensor 18 is processed by image processing unit 20, and then transmitted to memory unit 30. Memory unit 30 compresses the image data received from image processing unit 20 for temporarily storage, and performs expansion processing to the stored data for transmission to printer P. At the time, if necessary, a processing such as rotating editing processing is performed. Image processing unit 20 and the memory unit 30 will be described later.

Now, printer P will be described. Printing processing unit 40 is used to control laser optical system 60 based on the image data received from memory unit 30. Laser optical system 60 includes a semiconductor laser 61 which irradiates a laser beam having its modulation (on/off) controlled by printing processing unit 40, and a polygon mirror 62, an fθ lens 63 and mirrors 64 and 65 for directing the laser beam irradiated from semiconductor laser 61 onto photoreceptor drum 71 for scanning.

Provided along the direction of rotation around photoreceptor drum 71 driven to rotate are a corona charger 72, a developer 73, a transfer charger 74, a separation charger 72, a cleaner 76 and an eraser lamp 77, and a toner image is formed by a well known electrophotographic process, and transferred onto a paper sheet. The paper sheet is sent from paper feeding cassettes 81, 82 by paper feeding rollers 83 and 84 to the transfer position where transfer charger 74 faces photoreceptor drum 72 through paper feeding path 85 and timing roller 86. The paper sheet transferred with the toner image at the transfer position is discharged from printer P through a transport belt 87, a fixing device 88, a post-fixing roller 89, and a discharge roller 94. These various kinds of rollers and photoreceptor drum 71 are driven by a main motor M1. In the vicinity of paper feeding cassettes 81 and 82, sheet size detection sensors SE2 and SE3 for detecting the sizes of paper sheets accommodated in cassettes 81 and 82, and sensors SE4 and SE5 for detecting the state of accommodated paper sheets in cassettes 81 and 82 (near empty, empty) are provided.

In the sheet path, sheet detection sensors SE6 to SE9 for detecting the transport state of a sheet and timing are provided. By detecting the states of sheet detection sensors SE6 to SE9, a trouble such as a paper jam can be detected. Sheet detection sensors SE6 to SE9 are provided before timing roller 86, in the vicinity of transport belt 87, and after fixing roller 89, respectively.

Printer P is provided with a mechanism 90 for switchback transport in the case of copying a double-sided document or the like. Switch back transport mechanism 90 includes a path switching claw 91, a transport roller 92, a reversing roller 93, horizontal transport rollers 94 to 96, and a sensor SE10.

In a single-sided copying mode, a paper sheet passes by switch back transport mechanism 90 and is directly sent to finisher 600, or alternatively sent to switch back mechanism 90 for collating page order, switched back and sent to finisher 600. The method of switching back will be described later.

In a double-sided copying mode, left end portion of switching claw 91 is moved upwardly by the function of a solenoid which is not shown and a paper is sent from post-fixing roller 89 to reach a forward/reverse roller 93 through transport roller 92. When the tail end of the paper sheet reaches sensor SE10, forward/reverse roller 93 reversely rotates. Thus, the paper sheet is sent to the horizontal transport portion. Thus sent paper sheet is sent to timing roller 86 through horizontal transport rollers 94 to 96 and stands by there. If a plurality of sheets of paper are sequentially fed, the sheets are transported one after another at prescribed intervals so that they are not placed upon each other, and sent into finisher 600 after a toner image for the back side is formed. Since the length of the transport path of paper is fixed, the number of paper sheets for one cycle (maximum cycle number) by finisher 600 and horizontal transport rollers 94 and 96 depends on the size of the paper sheet.

Document transport unit 500 includes a multi-document tray 501 for setting a plurality of document sheets, a document single tray 504 for setting a single document sheet, document insert detection sensors 515, 516, document feed rollers 502, 505, document transport roller pairs 503, 520, and 522, document sending roller pairs 506 and 507, a document discharge roller pair 508, a document reversing roller pair 510 capable of rotating forwardly and reversely, a document page collating roller pair 509 capable of rotating forwardly and reversely, a document reversing switching claw 511, a document page collating switching claw 512, and a sensor 525 for detecting the tail end of a document sheet being out of roller pair 507

If a plurality of document sheets are set to multi-document tray 501, the printed surfaces are set facing upward. If a document sheet is set to document single feed tray 504, the printed surface is set facing downwardly.

When a document is read, first scanner 13 travels to the reading position as described above and stops, then the document is transported at a fixed speed by document sending roller pairs 506, 507, and the document information is read.

If only one side of each document sheet set at multi-document tray 501 is read, the document sheet fed by document feed roller 502 is sent to the document reading position through document transport roller pairs 503 and 520, and document sending roller pair 506, and discharged by document discharge roller pair 508 through document sending roller pair 507. More specifically, the document sheet is discharged having its printed surface facing downwardly. At the time, document reversing switching claw 511 and document page collating switching claw 512 are controlled by a solenoid which is not shown such that the document sheet passes through the above-described path.

Figure 3A:
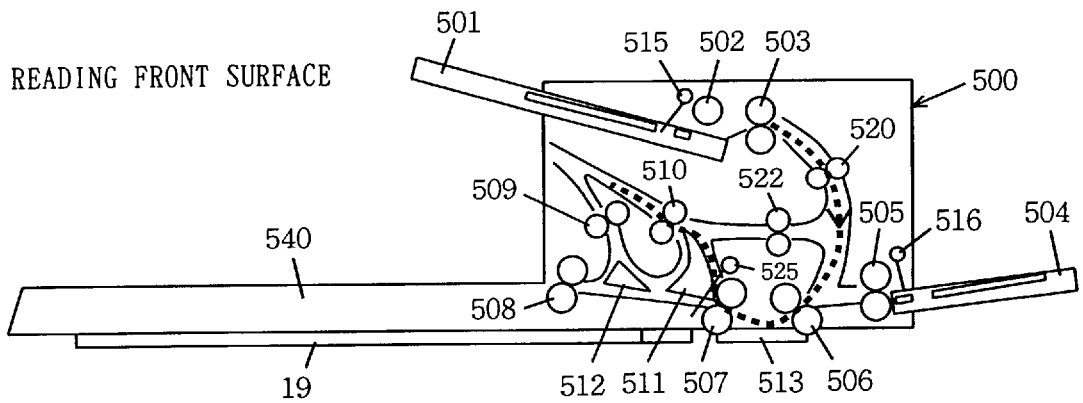
FIGS. 3A to 3C are views for use in illustration of a double-sided document reading mode in the copying machine shown in FIG. 1.

If both sides of each document sheet set at multi-document tray 501 are read, as shown in FIG. 3A, a document sheet fed by document feed roller 502 is sent to the document reading position through document transport roller pairs 503 and 520, and document sending roller pair 506 in order to read the front surface, and then sent to document reversing roller pair 510 through document sending roller pair 507 by the function of document reversing switching claw 511.

Figure 3B:
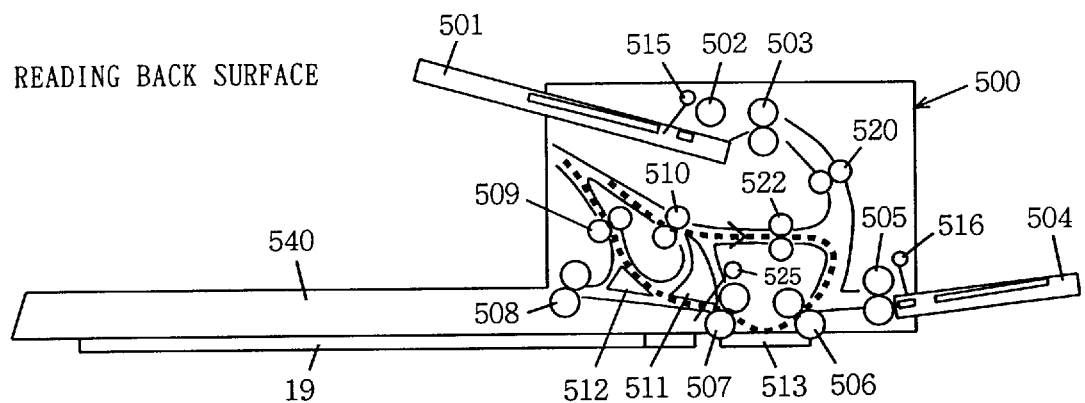

The document sheet is transported for a prescribed length by document reversing roller pair 510 in order to read the back surface, then as shown in FIG. 3B, document reversing roller pair 510 reversely rotates to allow the document sheet to be sent toward document sending roller pair 506 through document transport roller 522. Thereafter, via the document reading position, the document sheet passes through document sending roller pair 507, and is sent to document page collating roller pair 509 by the function of document reversing switching claw 511 and document page collating switching claw 512.

Figure 3C:
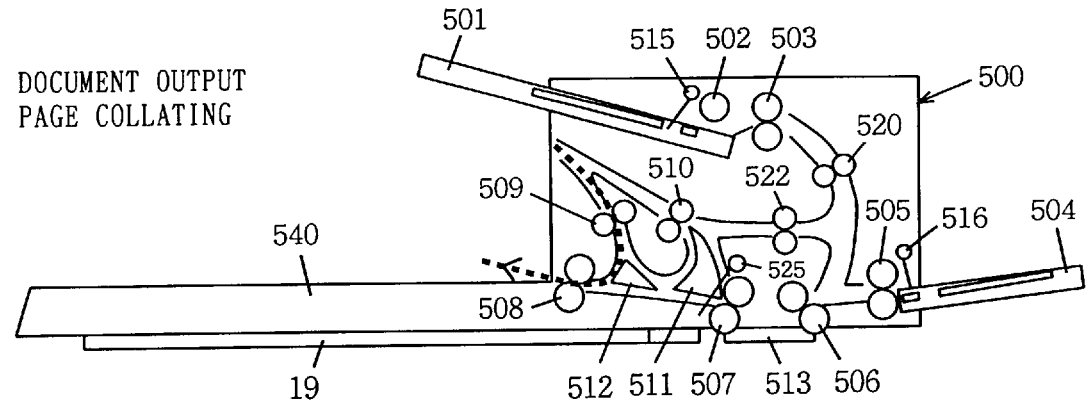
Figure 4:
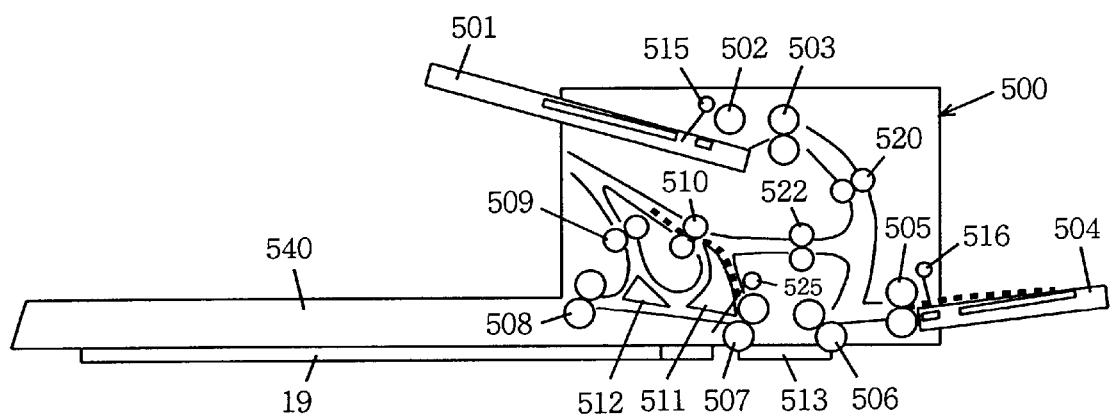
FIG. 4 is a view for use in illustration of an interrupt reading processing of a document placed on a single feed tray 504 in the copying machine shown in FIG. 1.

The document sheet is transported for a prescribed length by document page collating roller pair 509, and then as shown in FIG. 3C, document page collating roller pair 509 reversely rotates to allow the document sheet to be sent toward document discharge roller pair 508 by the function of document page collating switching claw 512, then discharged onto document discharge tray 541. More specifically, the document sheet is discharged having its front surface facing downward. Thus, the document pages are thus collated.

During switching the front surface of a double-sided document sheet to the back surface, an essential point in the process according to the present invention, if a document sheet placed in single feed tray 504 is to be read, the document sheet is transported in the timing in which the reading of the front surface of the document sheet is completed and the tail end of the document sheet. comes out of sensor 525.

When a document sheet set at single feed tray 504 is read, the document sheet fed by feed roller 505 is sent to the document reading position through document sending roller pair 506, and is discharged onto document cover 540 through document sending roller pair 507 and document discharge roller pair 508. At the time, document reversing switching claw 511 and document page collating switching claw 512 are controlled by solenoids which are not shown such that the document sheet passes through the above-described path.

Document transport unit 500 further includes a sensor group 530 for detecting the length of a document sheet placed in multi-document tray 501, and a sensor group 531 for detecting the width of the document sheet placed at multi-document tray 501.

Document transport unit 500 further includes a sensor group 533 for detecting the length of a document sheet placed in single feed tray 504, and a sensor group 534 for detecting the width of a document sheet placed in single feed tray 504.

Finisher 600 as shown in FIG. 1 includes a tray 610 with accommodating function for stapling, a tray with elevating function 630, a stapler unit 620, a path switching claw 602 and transport rollers 601 and 603 to 607.

If a staple mode is set, a paper sheet reversed by the switch back mechanism 90 of printer P is discharged from printer P through discharge roller 94. The sheet sent into finisher 600 is sent to transport roller 603 by the switching of path switching claw 602 via transport roller 601. Path switching claw 602 is controlled by a solenoid which is not shown to selectively send the sheet to one of transport rollers 603 and 604 depending upon the set copy mode. The sheet discharged from transport roller 603 is discharged onto tray 610. One set of sheets are discharged onto tray 610, then sent to stapler unit 620 by transport roller 607 for stapling processing, stapled at a prescribed position, and then discharged to tray 630 through transport rollers 605 and 606.

In a mode other than the staple mode, the paper sheet discharged from printer P is discharged onto tray 630 through transport rollers 601 and 604 to 606.

Figure 5:
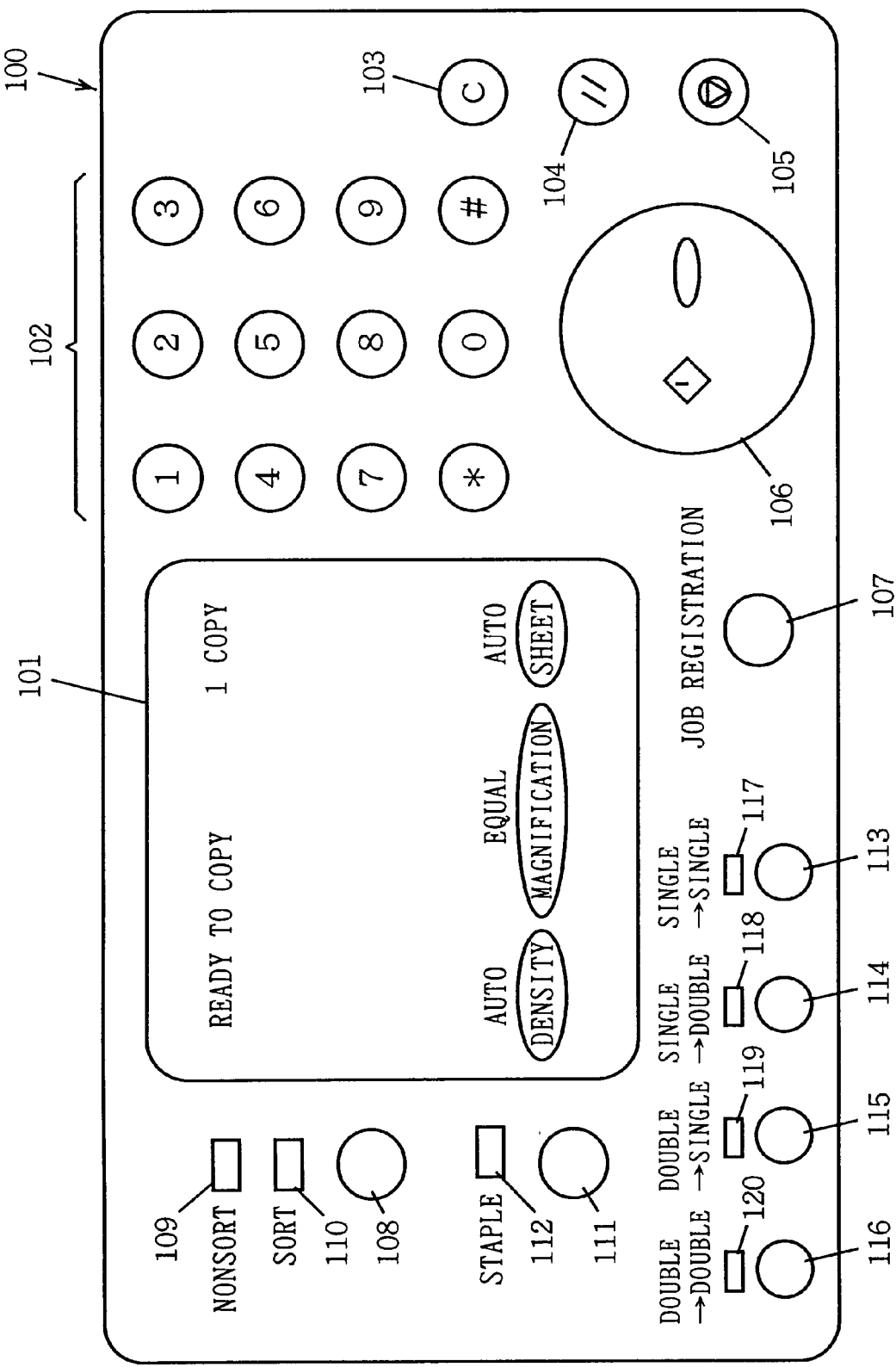
FIG. 5 is a plan view showing an operation panel in the copying machine shown in FIG. 1.

FIG. 5 is a plan view showing an operation panel 100. In FIG. 5, operation panel 100 includes a liquid crystal touch panel 101 for displaying states and setting various modes, a ten key 102 used to input a numerical condition for copying (the number of sheets or magnification), a clear key for returning the numerical condition to standard values, a panel reset key 104 for initializing the copy mode, a stop key 105 to instruct stopping of copying, a start key 106 to instruct initiation of copying, and a job registration key 107 for registering a job.

Operation panel 100 further includes a mode setting key 108 for setting "NONSORT" or "SORT", a display portion 109 for indicating that "NONSORT" is selected, a display portion 110 for indicating that "SORT" is selected, a mode setting key 111 for setting the staple mode, and a display portion 112 for indicating that the staple mode is selected. Operation panel 100 further includes keys 113 to 116 for selecting a mode for the relation between a document and output, in other words a key 113 for setting a single-sided copying from a single sided document, a key 114 for setting a double-sided copying from a single-sided document, a key 115 for setting a single-sided copying from a double-sided document, a key 116 for setting a double-sided copying from a double-sided document, and display portions 117 to 120 for indicating that keys 113 to 116 are selected, respectively.

Liquid crystal touch panel 101 indicates various states of copying machine 1 such as the nearer empty state of accommodated paper sheets, empty indication, jam indication upon a jam of a paper sheet, trouble indication upon a trouble, the operation mode of copying machine such as exposure level and magnification, and other various indications. The panel also accepts inputs for selecting an operation mode.

Figure 6:
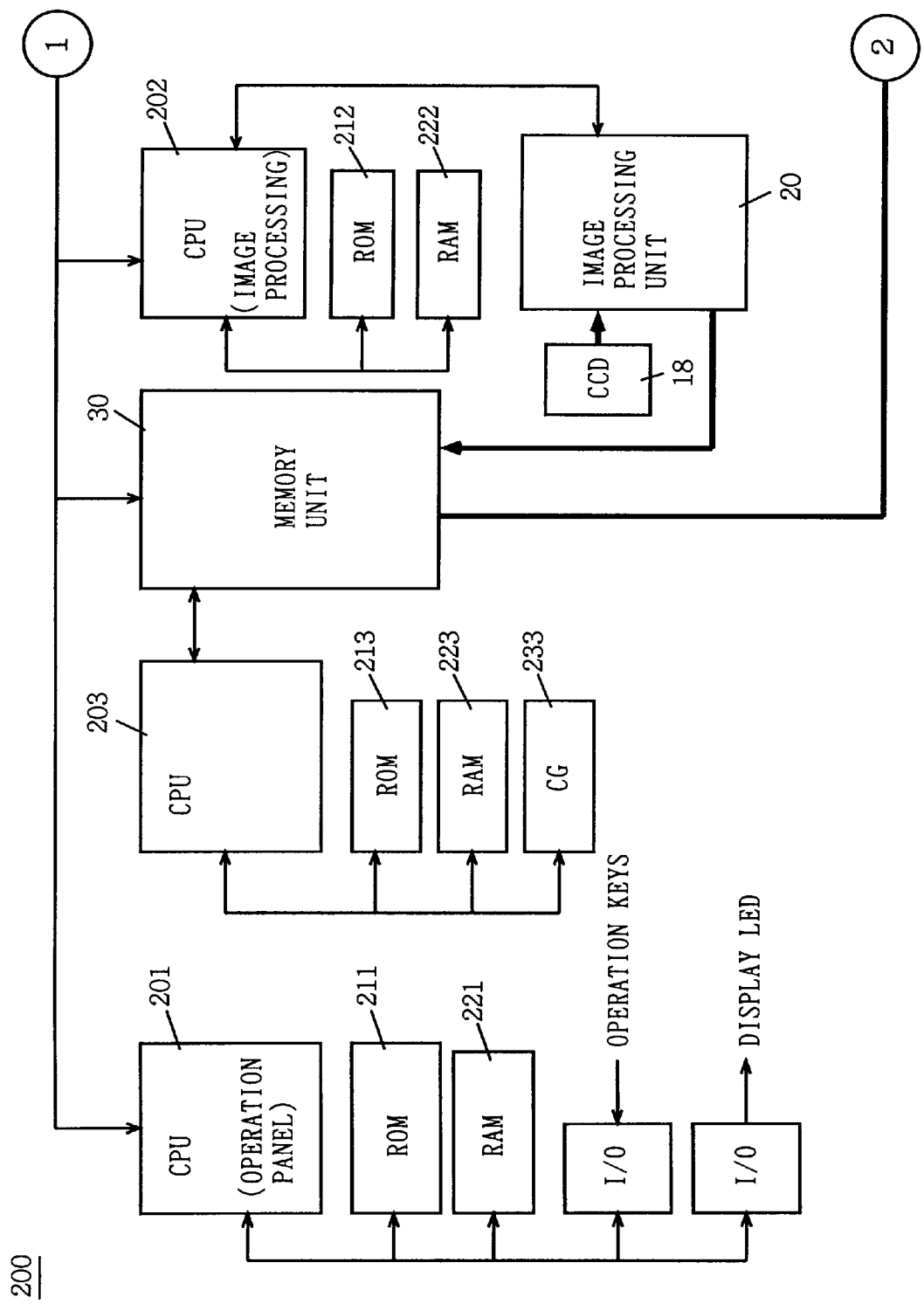
FIGS. 6 to 8 are block diagrams each showing the configuration of a control unit in the copying machine shown in FIG. 1.
Figure 7:
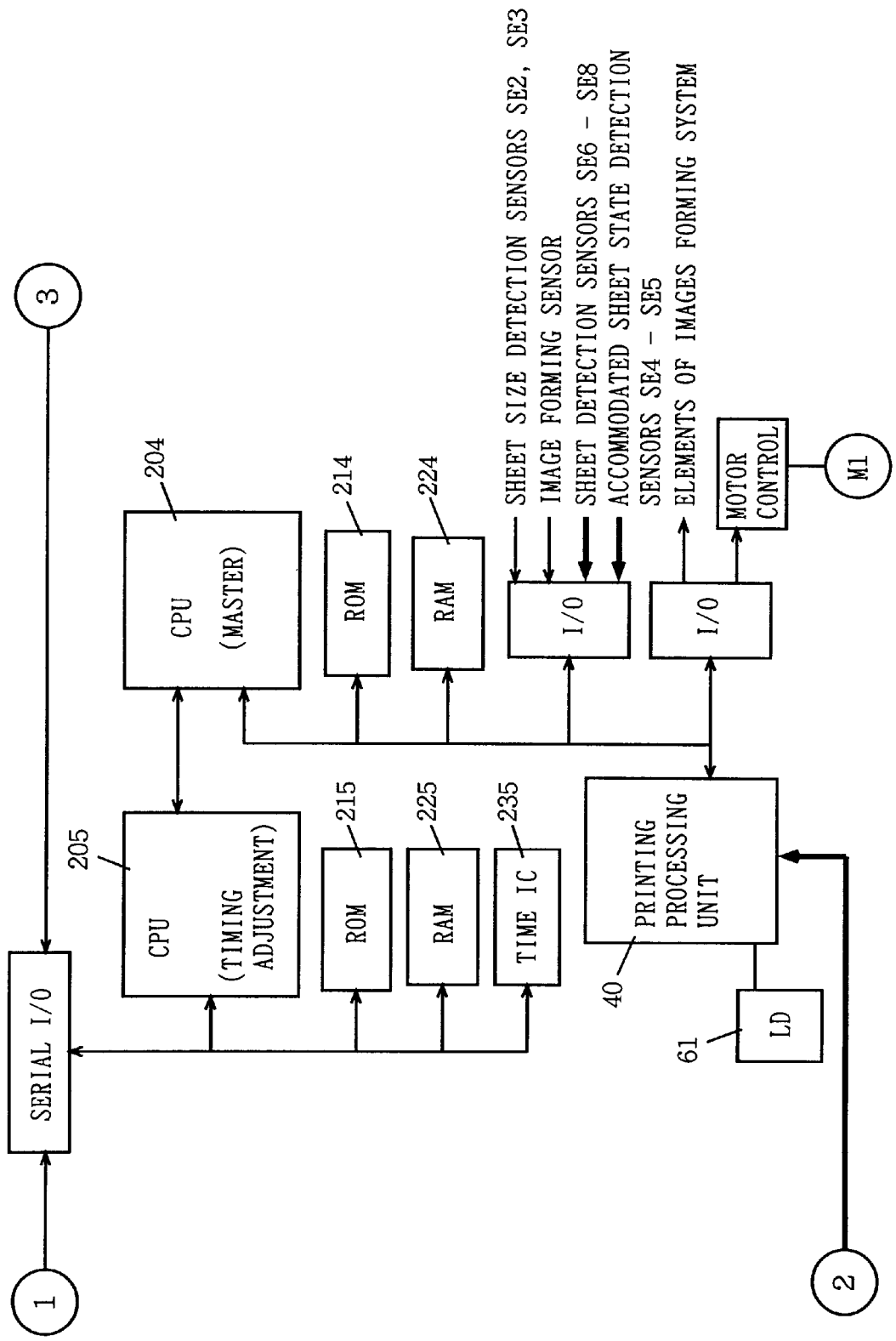
Figure 8:
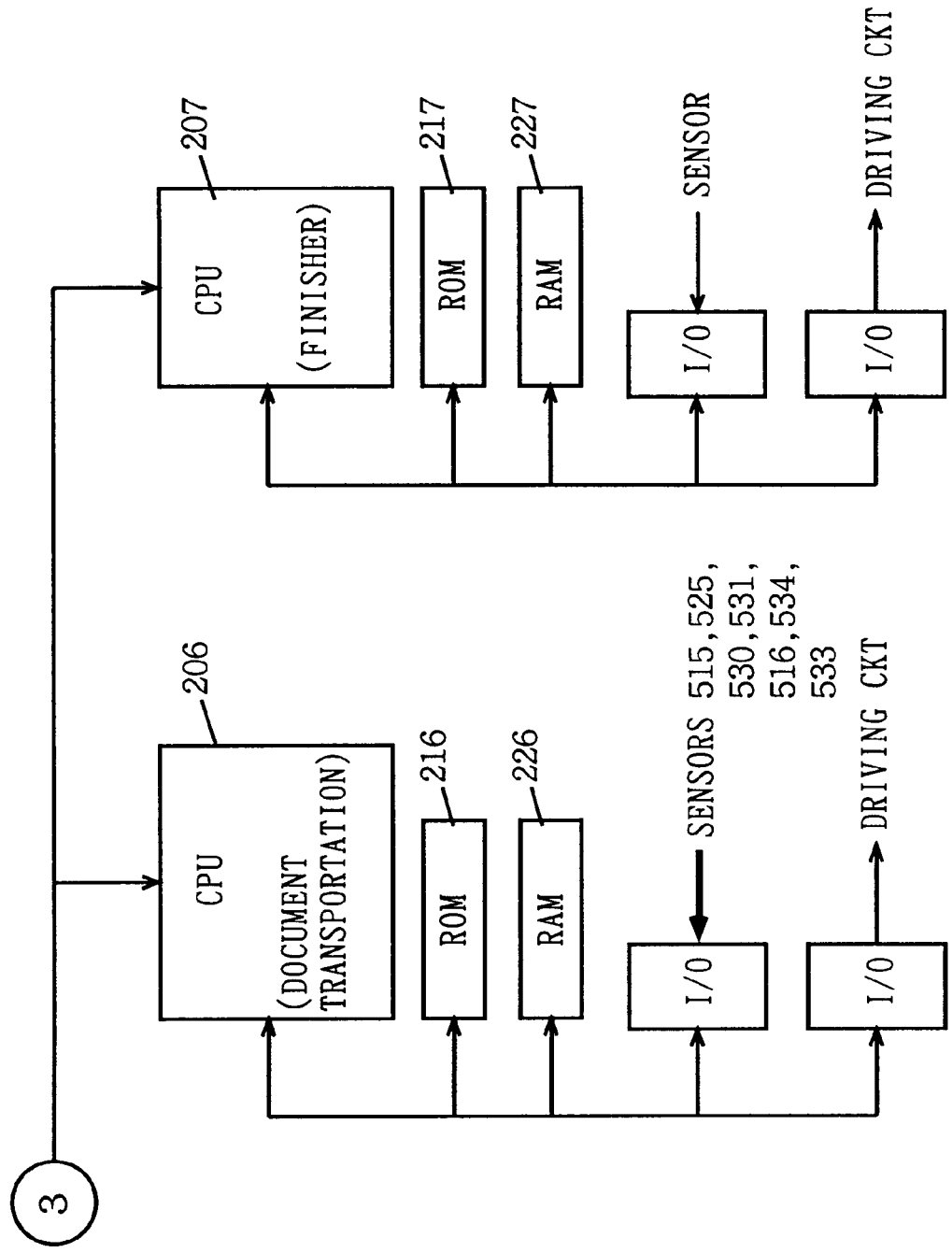

FIGS. 6 to 8 are block diagrams showing the configuration of a control unit 200 in copying machine 1 Referring to FIGS. 6 to 8, control unit 200 is mainly formed of seven CPUs 201 to 207, which are provided with ROMs 211 to 217 storing programs and RAMs 221 to 227 serving as working areas for executing the programs.

CPU 201 performs control related to input of signals from various operation keys and display on operation panel 100. CPU 202 controls each portion of image processing unit 20 and driving of scanning system 10. CPU 204 controls printing processing unit 40, laser optical system 60 and image forming system 70. CPU 205 performs processings for adjusting overall timings for control unit 200 and setting operation modes. CPU 205 is connected with a clock IC 235 for controlling the working hours of copying machine 1 or the like. CPU 203 temporarily stores read image data in the image memory by controlling memory unit 30, and reads out the image data for output to print processing unit 40.

The output signals of sheet size detection sensors SE2 and SE3 are input to I/O controlled by CPU 204, and the size of copy sheet is managed by CPU 204. The states of sheet detection sensors SE6 to SE8 or accommodated sheet detection sensors SE4 and SE5 are also detected by CPU 204 through the I/O.

CPU 206 controls feeding of a document sheet by document transport unit 500. CPU 207 controls finisher 600.

Figure 9:
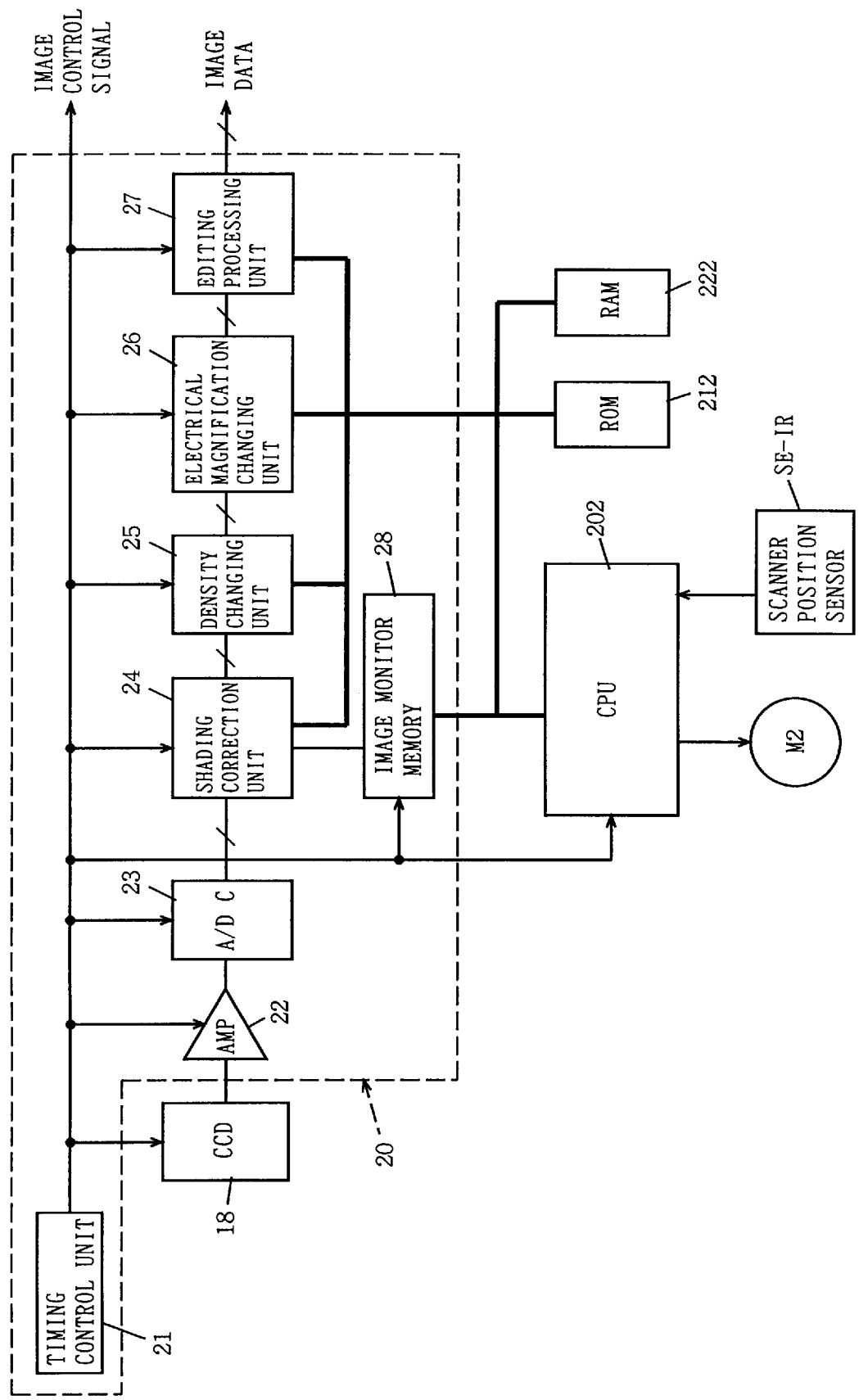
FIG. 9 is a block diagram showing the configuration of an image processing unit in the copying machine shown in FIG. 1.

Now, image processing unit 20 will be described. FIG. 9 is a block diagram showing the configuration of image processing unit 20.

In FIG. 9, an image reading synchronizing signal is applied to each block from timing control unit 21. Line sensor (CCD) 18 photoelectrically converts document information to produce an electrical signal. The electrical signal is amplified by an amplifier (AMP) 22 and is converted into a 8-bit digital signal by an A/D converter 23. Distortion caused by the optical system or the CCD is removed from the signal by a shading correction unit 24. Then, a density change unit 25 changes reflection data into density data, and a gamma correction processing is performed. The resulting signal is input to an electrical magnification changing unit 26, and electrically changed relative to the horizontal scanning direction in accordance with a set magnification information. Thereafter, image data edited by an editing processing unit 27 is supplied to image memory unit 30.

An image monitor memory 28 stores one line of image data in response to an instruction from CPU 202. CPU 202 sets parameters in blocks 24 to 26, controls scanning by driving a scanner motor M2, and controls the entire image reader IR including communication with host CPU 205.

Now, a description follows on how to detect a document size and whether a document is placed longitudinally or transversely. Image reader IR in this embodiment reads the irregular reflection component in light emitted from exposure lamp 11 and reflected by a document sheet using CCD 8, and does not use the direct reflection component. If a substance having a mirror surface is placed on platen glass 19 (or platen glass 513), the substance directly reflects almost the entire incoming light, and therefore the irregular reflection component coming into CCD 18 will be very little. Taking advantage of the characteristic, whether a read image is a document image or not is determined by scanning the document considering that document cover 540 in FIG. 1 serves as a mirror surface substance, and the part through which a greater amount of light comes into CCD 18 is determined as a document. A mirror surface allows a very little amount of light to come into CCD 18, and therefore, determination can be easily made. Therefore, scanning may be made while the document cover is lifted up.

If a document on platen glass 19 is copied, CPU 202 performs prescanning in response to an instruction of document size detection operation from host CPU 205. CPU 202 controls scanner motor M2 based on scanner position information from scanner position sensor SE-IR, and controls scanner 17 to scan in the vertical scanning direction. In the timing corresponding to the vertical scanning position, a document size, and if the document is longitudinally or transversely placed are detected based on the content of image data and the monitor position information, and the result of determination is transmitted to host CPU 205.

CPU 202 controls the scanning speed of scanner motor M2 corresponding to magnification information transmitted from host CPU 205 at the time of reading an image.

Figure 10:
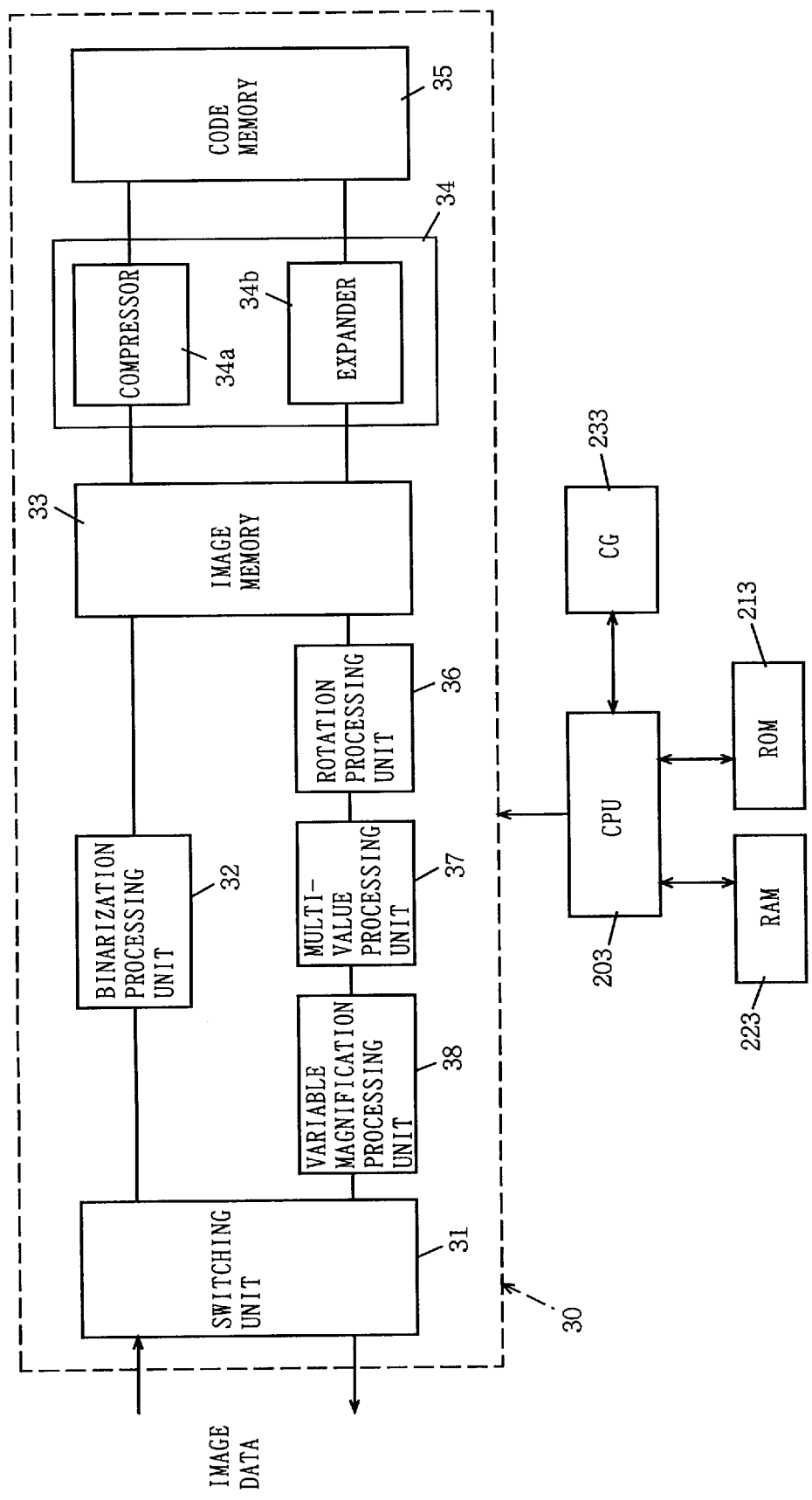
FIG. 10 is a block diagram showing the configuration of a memory unit in the copying machine shown in FIG. 1.

Now, memory unit 30 will be described. FIG. 10 is a block diagram showing the configuration of memory unit 30.

In FIG. 10, memory unit 30 includes a switching unit; 31, a binary processing unit 32 for producing binary data based on parameter set by CPU 203, a multi-port image memory 33 having a capacity for two pages in A4 size at 400 DPI, a code processing unit 34 having a compressor 34a and an expander 34b capable of operating independently from each other, a multi-port code memory 35, a rotation processing unit 36, a multi-value processing unit 37 for producing multi-value data based on parameter set by CPU 203, and a magnification changing processing unit 38. These controls are performed by CPU 203. CPU 203 is connected with a character generation IC (CG) 233 for printing desired characters.

Code processing unit 34 reads image data written in image memory 34, compresses the read data into code data, and write the code data in code memory 35. Code processing unit 34 also reads and expands the code data written in code memory 35 into image data, and writes the image data in image memory 33 in response to an instruction from CPU 203. When image data for a plurality of pages is written in image memory 33, expansion corresponding to the position and area to write can be controlled.

When image data for one page is produced by expansion and stored in image memory 33, CPU 203 calls image data from image memory 33 and supplies the image data to rotation processing unit 36. The image data is processed to rotate as desired in rotation processing unit 36, and multi-value processing unit 37 produces multi-value image data, which is output through magnification changing processing unit 38. Magnification changing processing unit 38 can electrically change magnifications both in horizontal and vertical directions. Note that compressor 34a and expander 34b can operate independently from each other and in parallel from each other. Between these devices and code memory 35, data is DMA-transferred. During temporarily storing document images as above, code memory 35 is managed by management table MT1 provided within RAM 223. These devices are controlled by CPU 203.

Figure 11:
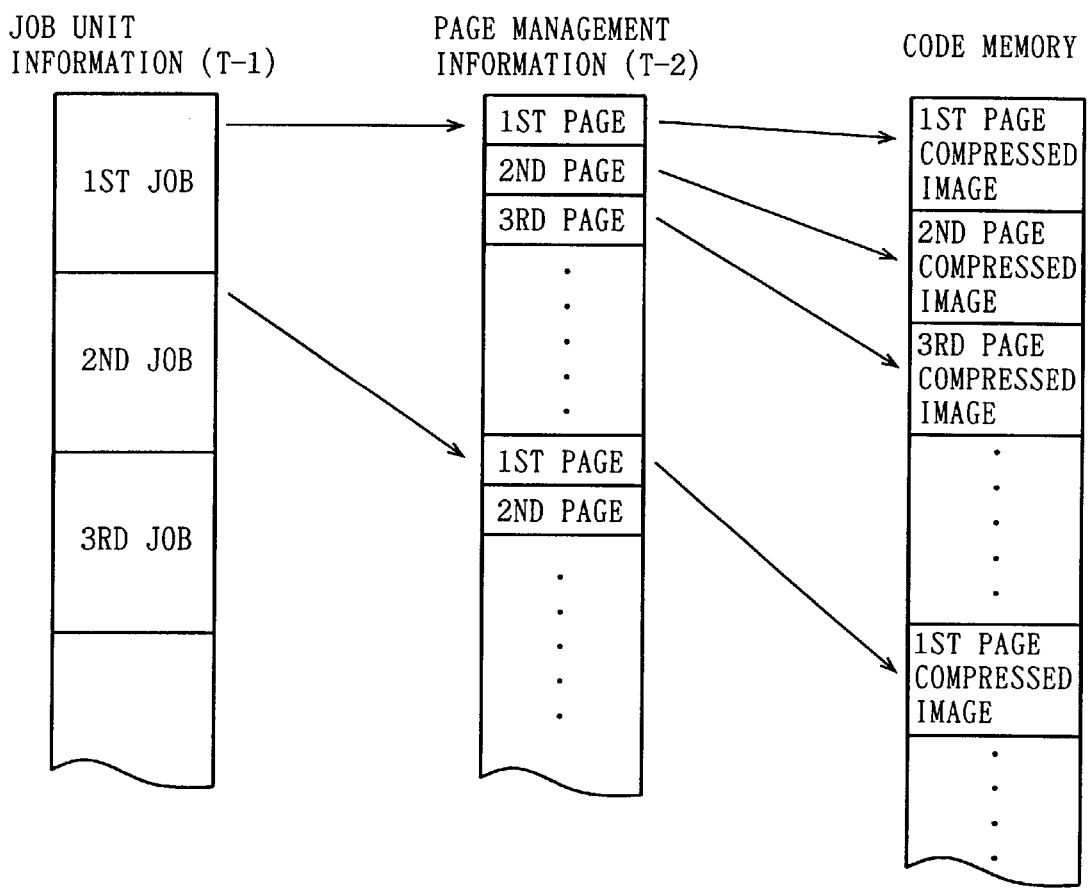
FIG. 11 is a block diagram showing the configuration of a management table in an RAM in FIG. 10.

FIG. 11 schematically shows management table MT1. In order to read and compress a document, image information should be managed on a job-basis, and therefore a plurality of pages within a job are separated and stored. Therefore, management table MT1 includes a table T-2 storing separated page unit information, and a table T-1 for storing job-unit information.

Table T-1 for job unit information stores a job ID, the registered state of the job, the place where page management information is stored, and a copy mode including a specified number (the number of copies), and the kind of saving copy. Page management information table T-2 stores where compressed image data is stored.

CPU 203 produces information in management table MT1 while stores compressed image data in code memory 35 by controlling compressor 34a when it reads out and compresses image data from image memory 33 in response to an instruction from CPU 205.

When image data is output, conversely, compressed image data is read out from code memory 35. Information within management table MT1 is erased once information on a page of interest is normally read out and a number specified by the operator (the number of copies) is copied.

Figures 12A, 12B:
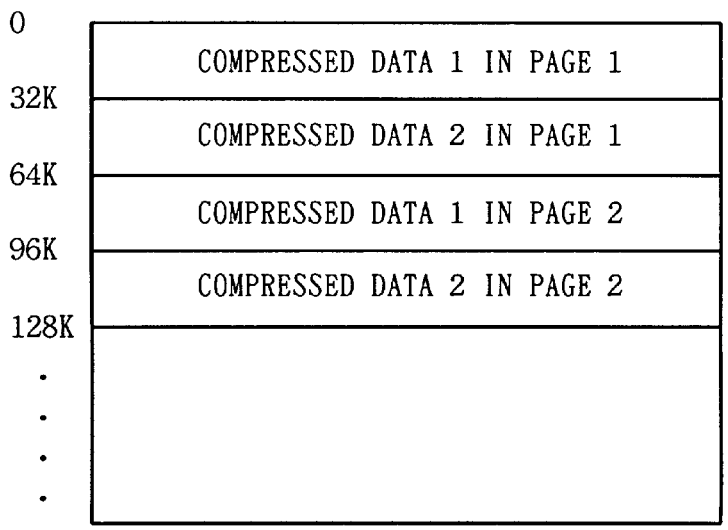
FIGS. 12A and 12B show the relation between the management table shown in FIG. 11 and a code memory shown in FIG. 10.

FIGS. 12A and 12B show the relation between management table MT1 and code memory 35. In FIG. 12B, code memory 35 is separated into memory areas on a 32K-byte-basis, and code data for each page is stored in each region, in order to allow simultaneous control of writing (while reading) and reading (while printing).

Management table MT1 stores various additional information necessary for compression/expansion processing such as a number indicating a region in code memory 35, the page number of image data PN (the number of a document image) attached in the order of writing (when scanning a document), the number of a region to be coupled, an image registration number, a compression method and a data length, and code memory 35 is dynamically controlled based. on these kinds of information.

"Forward concatenation" in FIG. 12A represents the forward connection of a region for every 32K bytes in each page, and the region with "00" is the first storage region for data for 1 page. Similarly "rearward concatenation" indicates the number of a region following that region other than "FF" which shows that the region is the last region.

CPU 203 refers to information in management table MT1 in order to read and compress image data from image memory 33, and stores the image data in code memory 35 by controlling compressor 34a. When image data is output, converse to the above mentioned operation, code data is read out from code memory 35. Information in management table MT1 is erased once information on a page of interest is normally read out and a number specified by the operator (the number of copies) is completed.

Now, a description follows on the operation sequence of copying machine 1, particularly on a request command (Q), and a report (A) exchanged between the CPUs and the flow of data.

FIG. 13 schematically shows the sequence of a memory writing operation.

In FIG. 13, during a writing operation, image data is transferred from image processing unit 20 to image memory 34. CPU 205 controlling the entire sequence requests CPU 203 to make the memory ready. In response, CPU 203 makes various settings to internal hardware such as setting of a bus connection state for transferring image data from image processing unit 20 to image memory 34, setting of a mode for binary processing, and setting the initial address of a writing area in image memory 33 and XY length information.

When these settings are completed, CPU 203 signals CPU 205 that the memory is ready. If CPU 205 requests CPUs 202 and 203 to read, the control unit of CPU 202 requests its internal document scanning unit to start scanning.

Then, the document scanning control unit starts scanning, and once scanner 13 reaches an image region, reading data (image data) is transferred from image processing unit 20 to memory unit 30 depending on the image processing mode set by CPU 202.

When the scanning completes, and the completion of reading is signaled from CPUs 202 and 203, CPU 205 requests CPU 203 to compress data. CPU 203 then sets a reading address from image memory 33, XY length information, a writing address to code memory 35, and a mode for compressor 34a (such as arithmetic coding method, MH method), and activates various elements. Thus, a compression processing is performed and code data is stored in code memory 35. Once the compression processing completes, the completion is signaled from CPU 203 to CPU 205.

Figure 14:
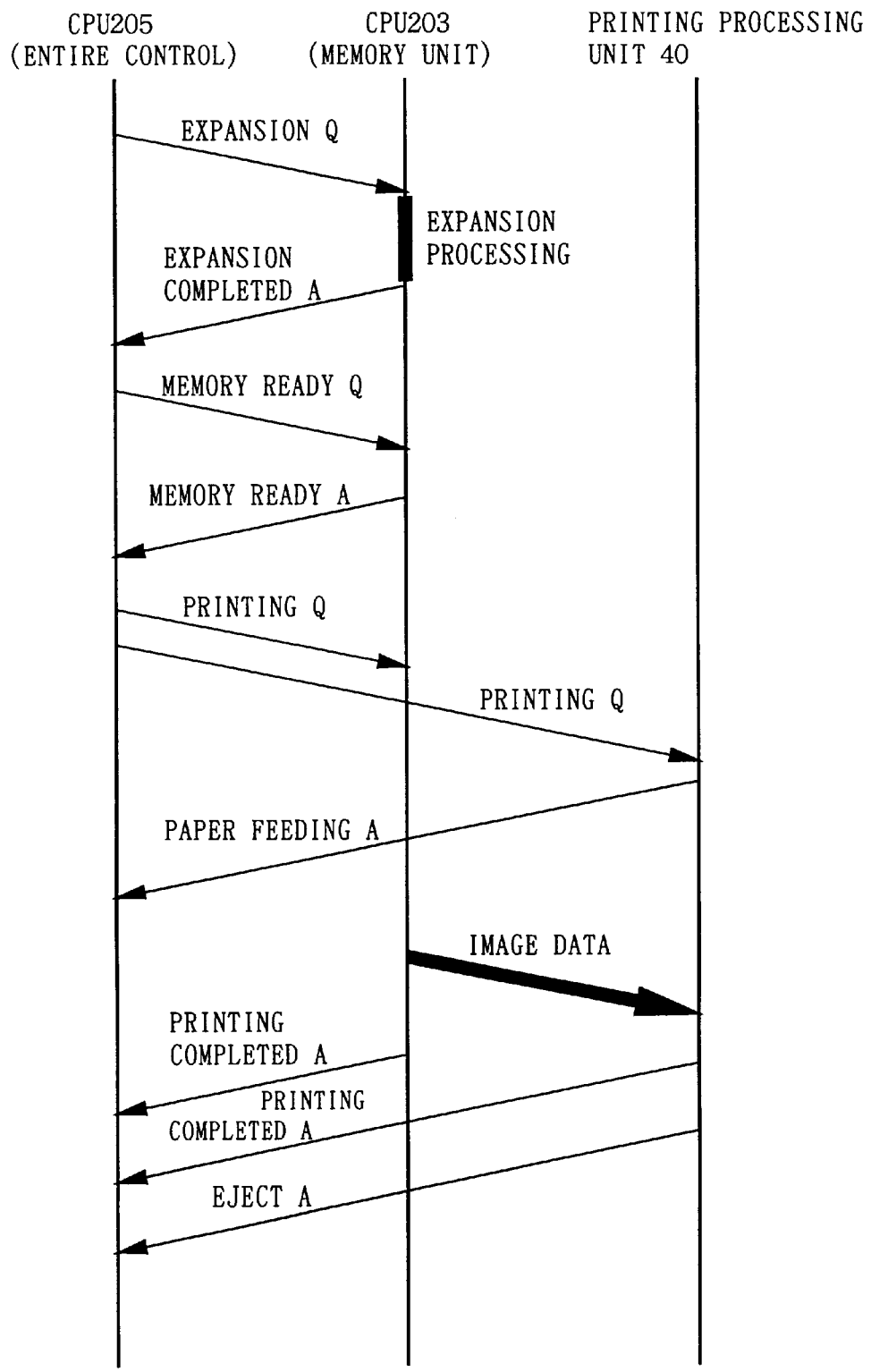
FIG. 14 shows a schematic sequence of a memory reading operation.

FIG. 14 schematically shows the sequence of a memory reading operation.

In FIG. 14, during the memory reading operation, image data is read out from image memory 33, and a copy image is printed onto a paper sheet based on the image data.

CPU 205 requests CPU 203 to expand data. CPU 203 sets a reading address from code memory 35, a data amount, a writing address to image memory 33, XY length information, and a mode for expander 34b (such as arithmetic coding system, MH system), and activate various elements. Thus, an expansion processing is performed, and image data is written in image memory 33.

Once the expansion processing completes, CPU 205 requests CPU 203 to make the memory ready in order to read out image data from image memory 33. CPU 203 makes settings to the internal hardware such as setting a bus connection state to output image data from image memory 33 to printing processing unit 40, setting for a rotation processing, the starting address of a reading region in image memory 33 and XY length information.

Once these settings are completed and CPU 205 is signaled of the completion, CPU 205 requests CPU 203 and printing processing unit 40 to start printing. Printing processing unit 40 sends a feeding report notifying the transport state of a paper sheet, and thereafter image data is read out from image memory 33 and output to printing processing unit 44 for printing.

Once the printing completes, CPU 203 and printing processing unit 40 send a printing completion report and an eject completion report to CPU 205. CPU 205 when receiving these reports gives a memory clear request to CPU 203 if necessary.

Now, the operation of each of CPUs 201 to 206 will be described by referring to flow charts, and the operation of copying machine 1 will be more clearly described.

Figure 15:
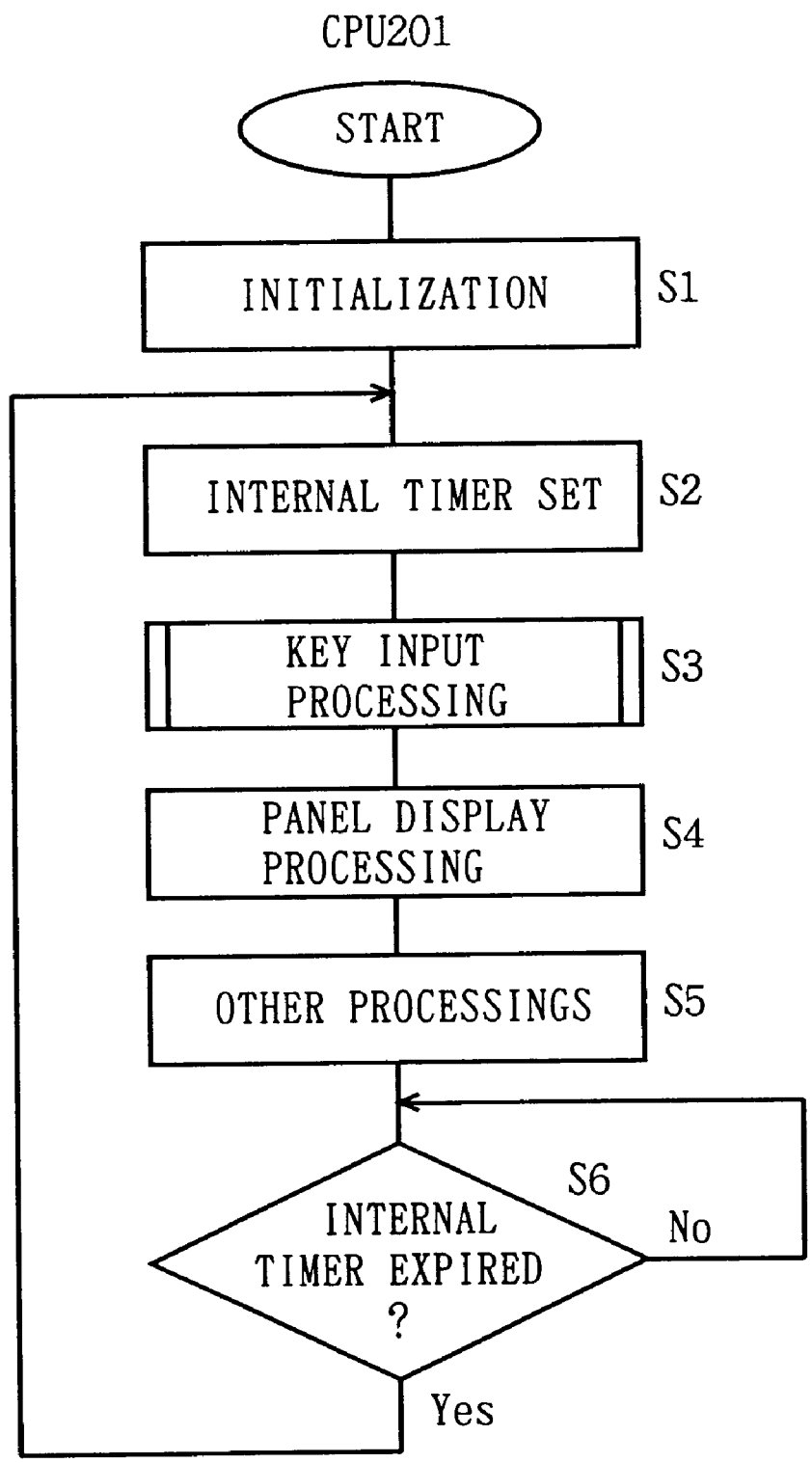
FIG. 15 is a main flow chart for use in illustration of the operation of a CPU 201 shown in FIG. 6.

FIG. 15 is a main flow chart for use in illustration of the operation of CPU 201 controlling operation panel 100.

When the power supply is turned on, CPU 201 initializes RAMs and registers (step S1). CPU 201 then sets an internal timer to determine the length of one routine (step S2), followed by a key input processing to accept key input operation (step S3), a panel display processing to make a display corresponding to an operation, (S4), other processings (step S5), and determination of whether the internal timer is expired (step S6), and the process is repeatedly executed. CPU 201 communicates with other CPUs from time to time as an interrupt processing.

Figure 16:
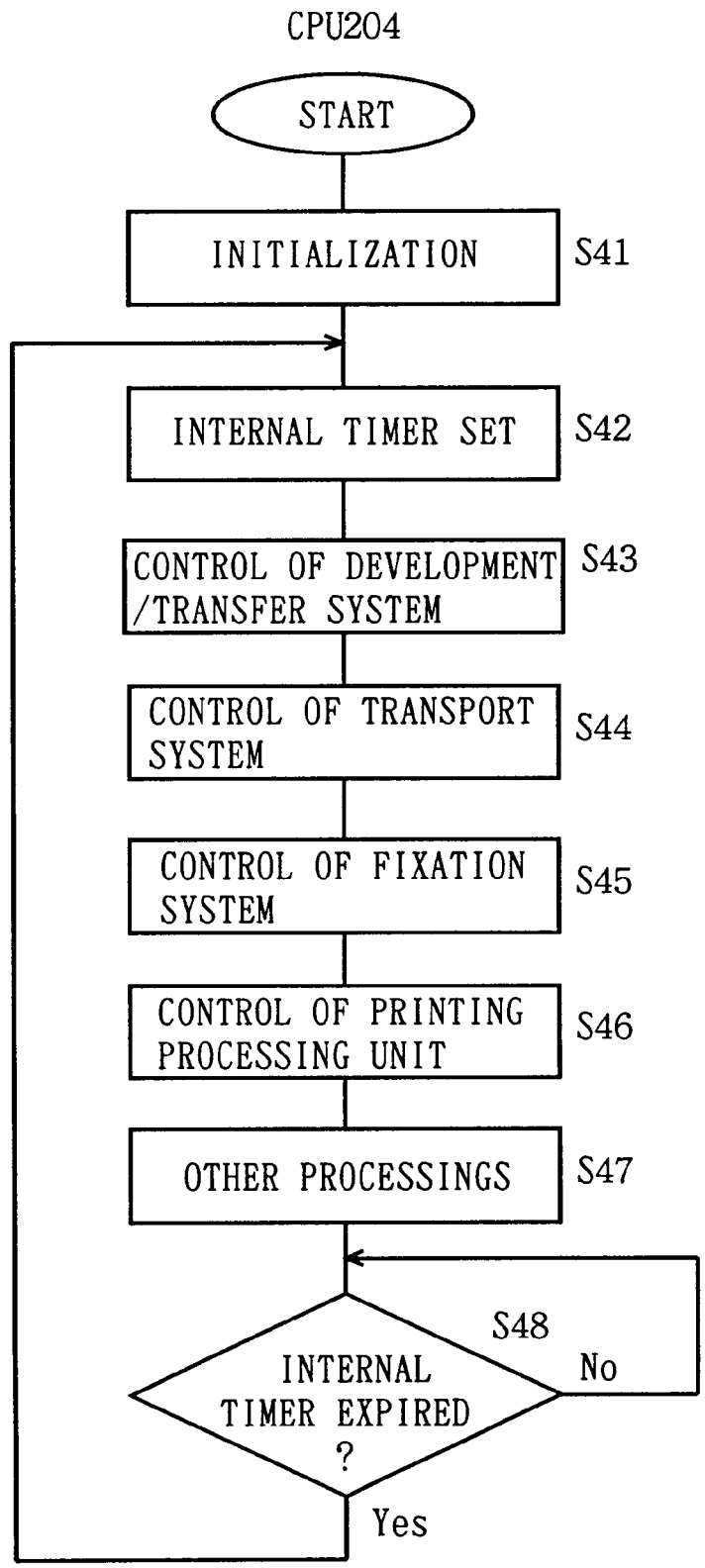
FIG. 16 is a main flow chart for use in illustration of the operation of a CPU 204 shown in FIG. 7.

FIG. 16 is a main flow chart for use in illustration of the operation of CPU 204 controlling printer P.

Following initialization (step S41), the internal timer is set (step S42), the developing/transfer system is controlled (step S43), the transport system is controlled (step S44), the fixing system is controlled (step S45), the printing processing unit is controlled (step S46) other processings are performed (step S47), whether the internal timer is expired is determined (step S48), and the process is repeatedly executed.

Figure 17:
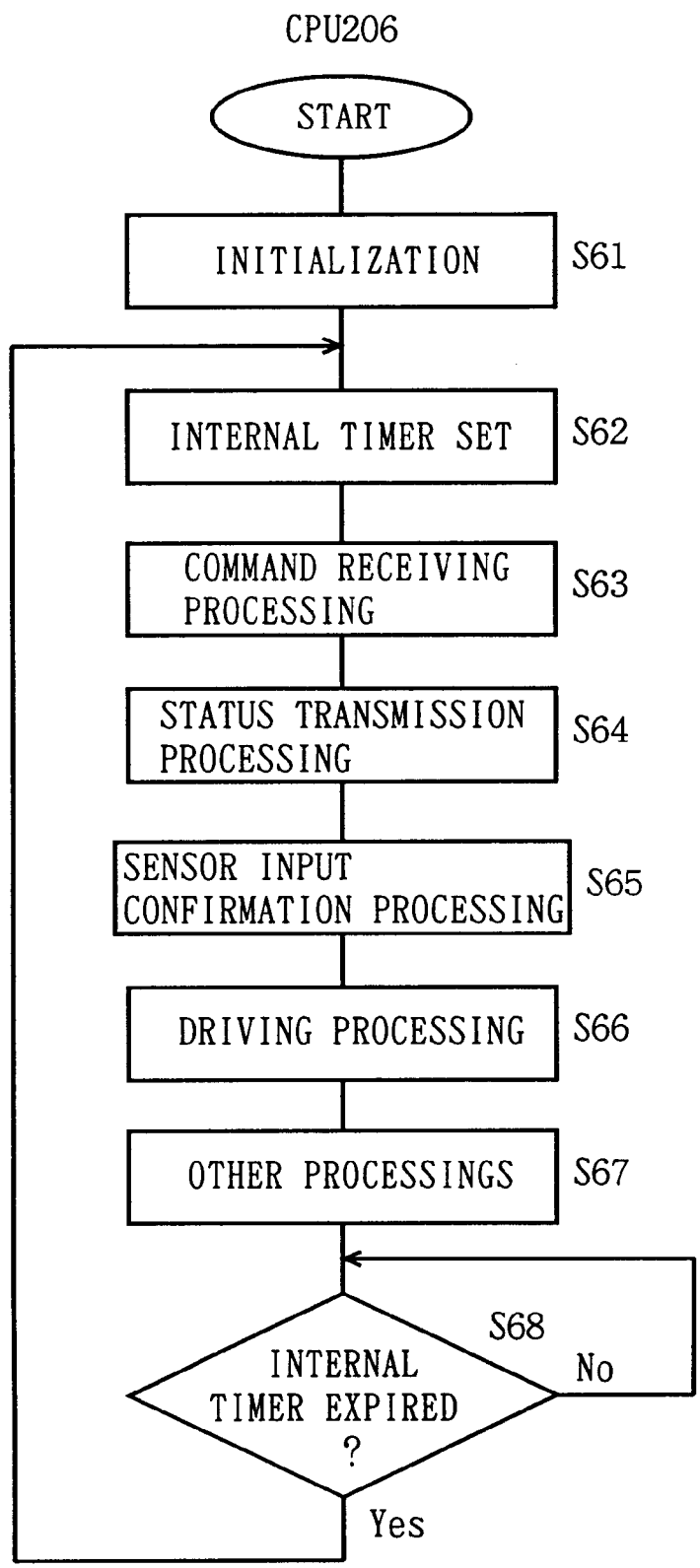
FIG. 17 is a main flow chart for use in illustration of the operation of a CPU 206 shown in FIG. 8.

FIG. 17 is a main flow chart for use in illustration of the operation of CPU 206 governing the control of document transport unit 500.

CPU 206 performs initialization (S61), then setting of the internal timer (step S62), a command receiving processing (step S63) to check data from another CPU, a status transmitting processing to transmit the state to another CPU (step S64), a processing to confirm the states of sensors 515 and 516 in document transport unit 500 (step S65), a processing to execute driving control including transport of a document (step S66), other processings (step S67), and determining if the internal timer is expired (step S68).

Figure 18:
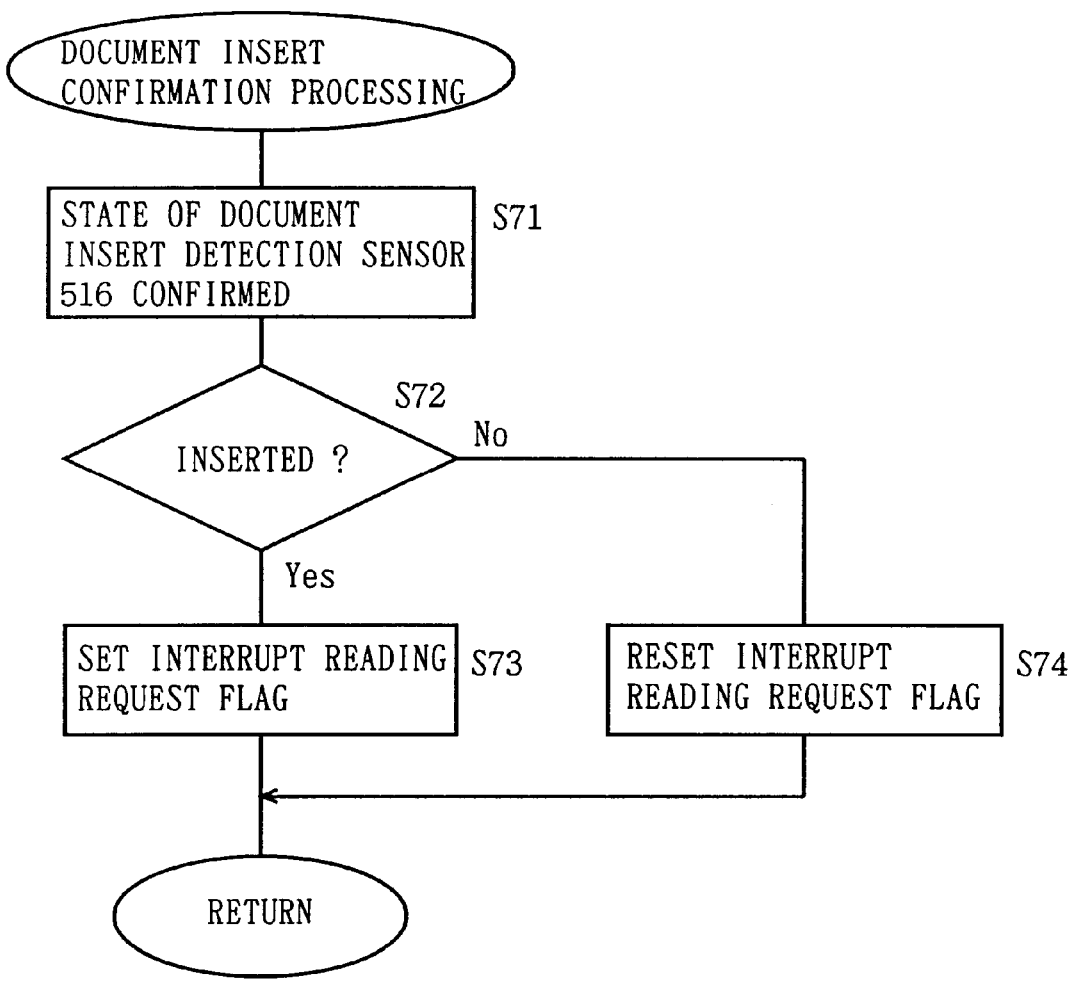
FIG. 18 is a flow chart for use in illustration of the subroutine of a document insert confirmation processing executed in "OTHER PROCESSINGS" in the main flow chart of CPU 206 shown in FIG. 17.

FIG. 18 is the flow chart of a subroutine for a document insert confirmation processing executed in other processings (step 67) in the main flow chart of CPU 206 governing the control of document transport unit 500.

During the processing, first in step S71, a processing to confirm the state of document insert detection sensor 516 is performed, followed by checking of the state of insertion in step S72. If it is determined in step S72 that a document is inserted, the process proceeds to step S73, and an "interrupt reading request" flag is set. Then, the subroutine is completed. The flag which will be used in another processing within CPU 206 and is stored in RAM 225.

If it is determined in step S72 that a document is not inserted, the process proceeds to step S74, and the "interrupt reading request" flag is reset, and the subroutine is completed.

Figure 19:
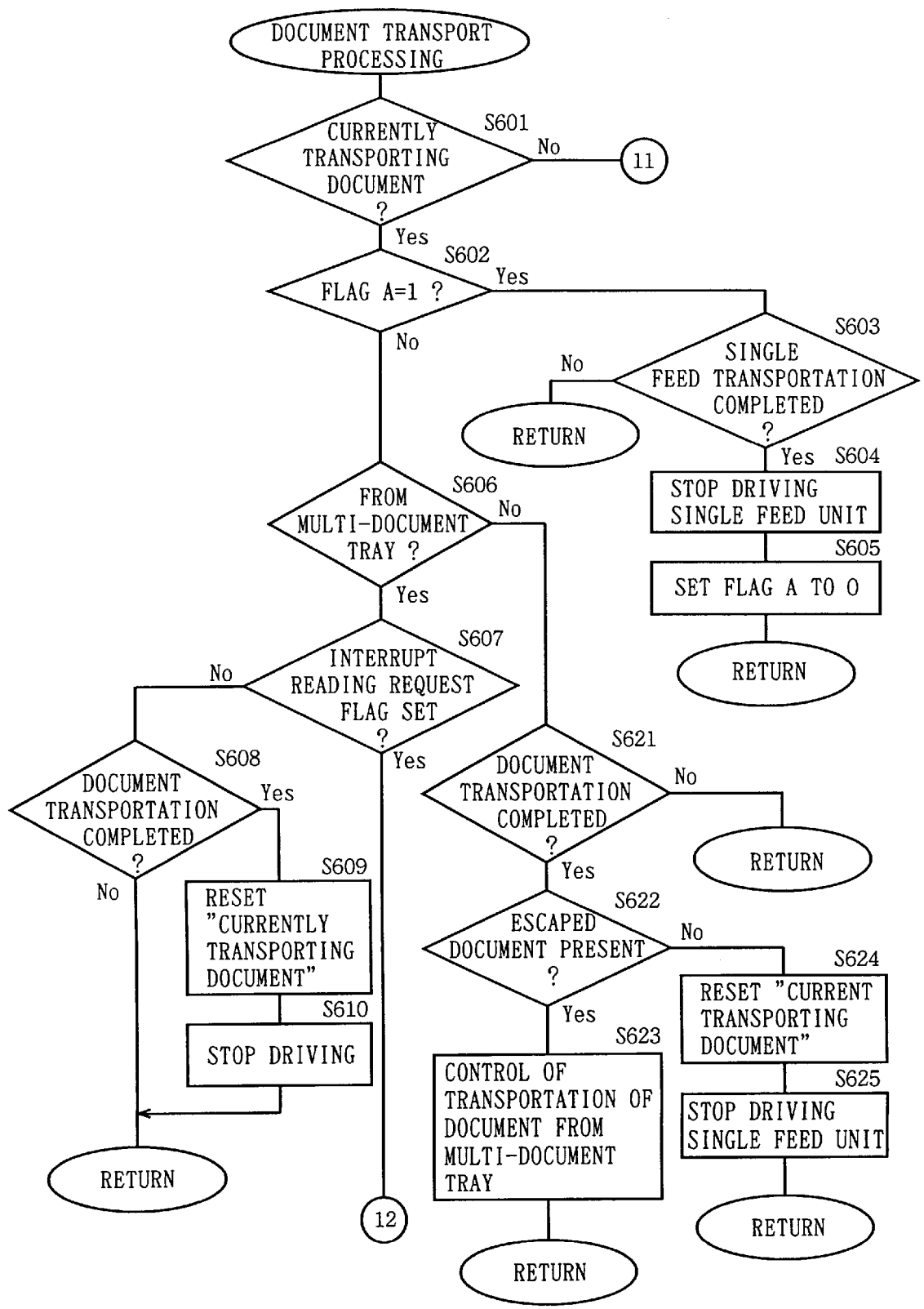
FIGS. 19 to 21 are flow charts for use in illustration of the subroutine of a document transport processing executed in "DRIVING PROCESSING" in the main flow chart of CPU 206 in FIG. 17.
Figure 20:
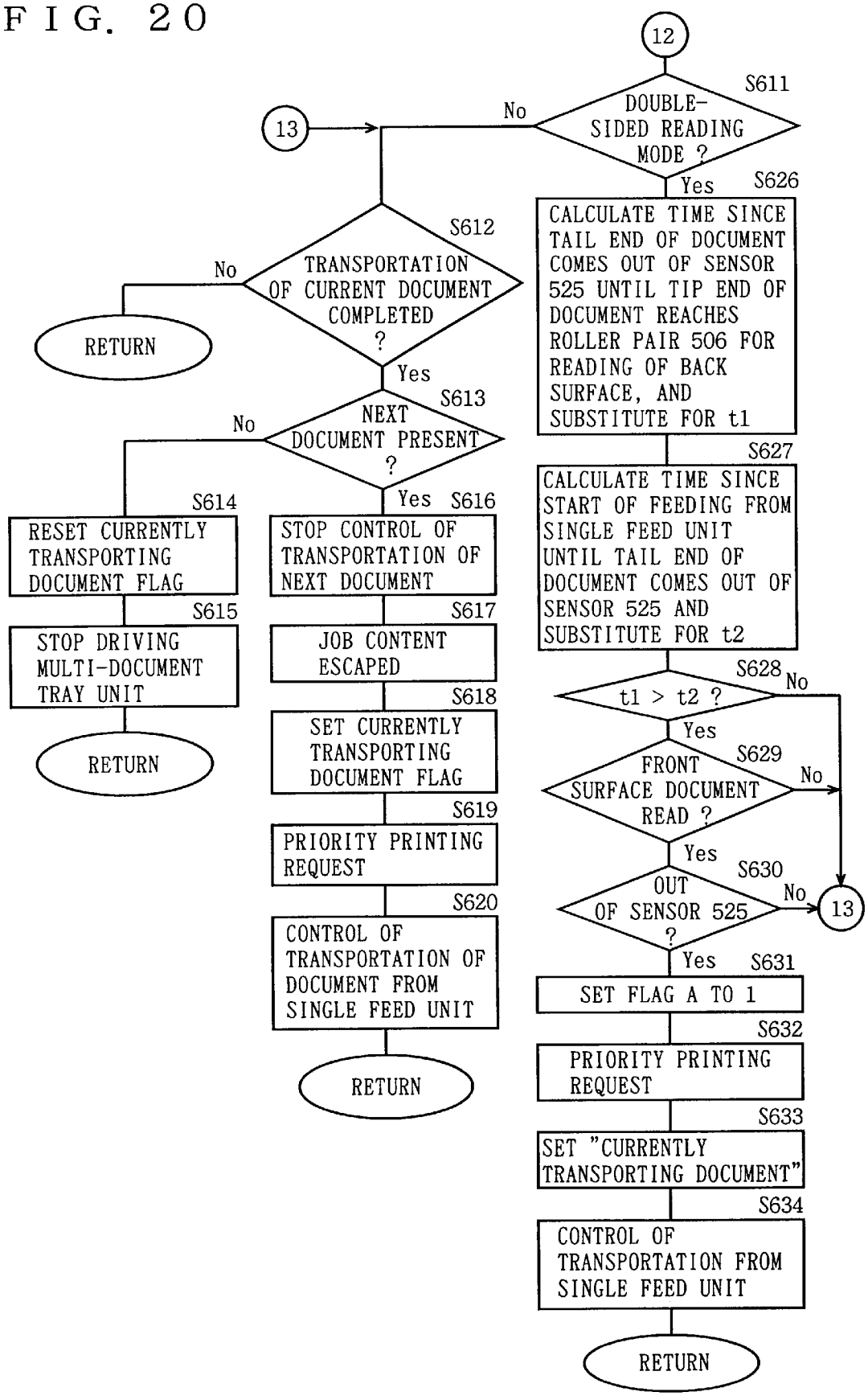
Figure 21:
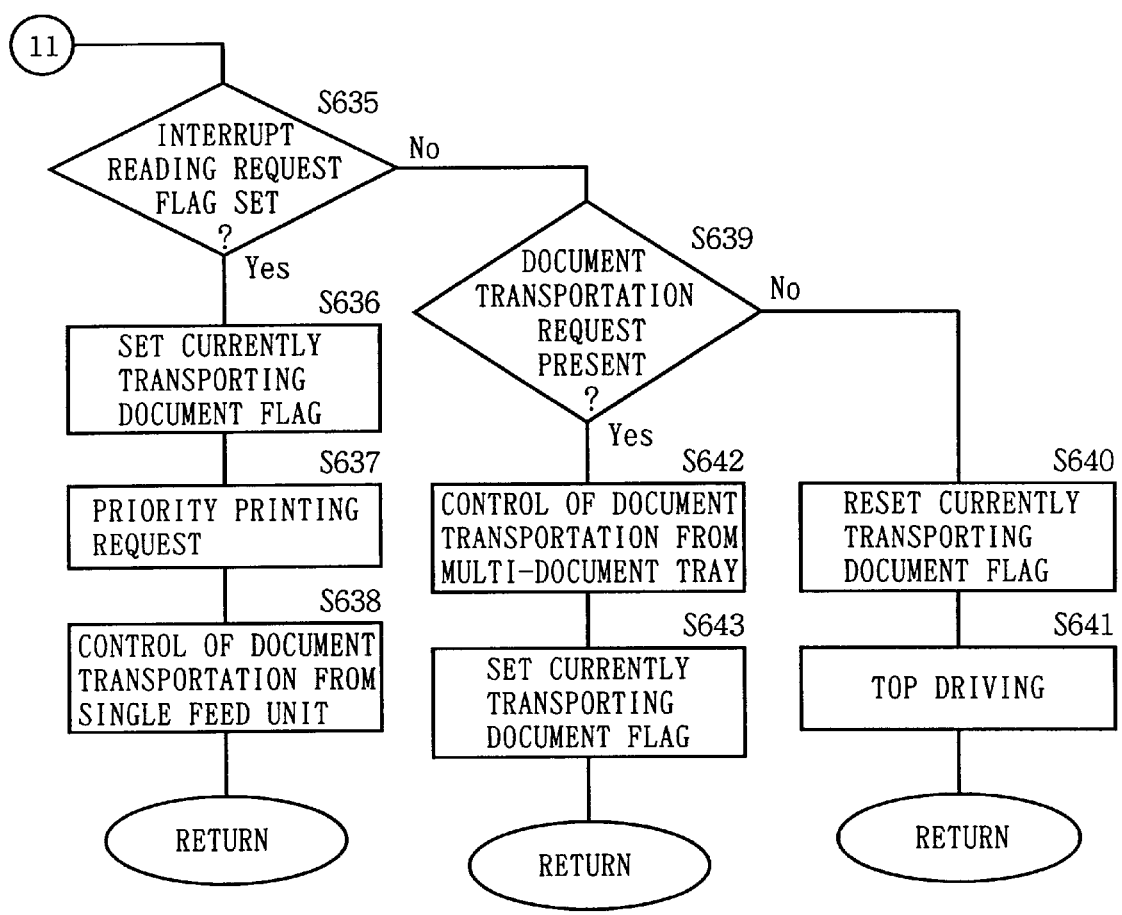

FIGS. 19 to 21 are flow charts of the subroutine of document transport processing executed in the driving processing (step S66) in the main flow chart of CPU 206 governing the control of document transport unit 500.

During the processing, it is first determined in step S601 if a "currently transporting document" flag is set, in order to confirm if a document is currently transported. "Document currently transported" basically refers to the period since the start of transport of the first document sheet until the end of transport of all the document sheets which have then placed in tray 501 in document transportation from multi-document tray 501. If it is determined that a document is currently transported, the process proceeds to step S602, and it is checked if a flag A is set to "1". Flag A is set when a document sheet is inserted in single feed tray 504 during controlling transportation from multi-document tray 501, and when it is determined that interrupt transport from single feed tray 504 is possible without lowering the efficiency of transporting the document from multi-document tray 501, an essential point of the process according to the present invention.

If it is determined in step S602 that flag A is set (to "1"), the process proceeds to step S603, and it is confirmed if the transportation from single feed tray 504 has been completed based on the output of sensor 516, and if the transportation has not been completed, the subroutine is completed. If it is determined that the transportation has been completed, the process proceeds to step S604, and driving of the single feed unit is stopped, flag A is set to "0" in step S605, thus completing the subroutine.

If it is determined in step S602 that flag A is not set to "1", the process proceeds to step S606, and it is confirmed if it is transportation from multi-document tray 501. If it is transportation from multi-document tray 503, it is checked in step S607 if an "interrupt reading request" flag is set. The "interrupt reading request" flag is set when a document is placed in single feed tray 504 as shown in FIG. 18, and the document is detected by document insertion detection sensor 516. If the "interrupt reading request" flag is not set in step S607, the process proceeds to step S609, it is checked if the document transportation has been completed, the subroutine is completed if the transportation has not been completed, and otherwise the "document currently transported" flag is canceled in step S609 followed by stopping driving in S610, thus completing the subroutine.

If it is determined in step S607 that the "interrupt reading request" flag is set, the process proceeds to step S611 in FIG. 20, and it is confirmed if the mode of reading the document from multi-document tray 501 is a double-sided document reading mode. The mode confirmation is achieved by referring to data available from another CPU during the command receiving processing in step S63. If the mode is not the double-sided document reading mode, the processing proceeds to the process in and after step S612, because the document cannot be transported from single feed tray 504 without lowering the efficiency of transporting the document from multi-document tray 501.

It is checked in step S612 if the transportation of the presently transported document has been completed. If it has not been completed, the subroutine is completed. If the transportation of the document has been completed in step S612, it is determined in step S613 if there is the next document sheet based on the output of sensor 515. If there is no document sheet to follow, the "currently transporting document" flag is reset, the driving of multi-document tray unit is stopped in step S615, thus completing the subroutine.

If it is determined that the next document sheet is present in step S613, the controlling of transporting the next document sheet is stopped in S616, and the content of a job in the stopped stage is escaped (interrupted) in step S617. Then in step S618, the "currently transporting document" flag is set, and a processing of issuing a priority printing request is executed in step S619. The priority printing request requests a read image to be output preferentially regardless of the order of reading, and the request is used in the processing of CPU 205. Data including a priority printing request is executed in the status transmission processing in step S64. Then, in step S620, a document transportation control from single feed tray 504 is started, thus completing the subroutine. Thus, an interruption processing when a document sheet is set at single feed tray 504 can be achieved while transporting a document from multi-document tray 501.

If it is determined in step S606 in FIG. 19 that the document is not from multi-document tray 501, the process proceeds to step S621, and it is determined if the transportation of the document has been completed. If the transportation has not been completed, the subroutine is completed. If the transportation has been completed, it is determined in step S622 if a document reading job has been escaped. If there is anything escaped, the process proceeds to step S623, a processing of starting document transportation control from multi-document tray 501 is executed, thus completing the subroutine. Thus, after the document transportation from single feed tray 504 is completed, the interrupted transportation of the document is automatically resumed. Herein, the operation is automatically resumed, but it may be resumed by pressing start key 106 in FIG. 5. If it is determined in step S622 that there is no job which has been escaped, a processing of canceling "document currently transported" is executed in step S624, a processing of stopping driving of the single feed unit is executed in step S625, and the subroutine is completed.

If it is determined in that the mode is the double-sided document reading mode in S611 in FIG. 20, the process proceeds to step S626, the time period since the tail end of a document comes out of sensor 525 until the tip end of the document reaches roller pair 506 for reading of the bottom surface is calculated, and the calculated value is substituted for "t1". For calculating the time period, document transport speed (or set magnification) information and transport processing information are used.

Then in step S627, the time period since feeding of a document from single feed tray 504 is started until the tail end of the document comes out of sensor 525 is calculated and the calculated value is substituted for "t2". For calculating the time period, document transport speed (or set magnification) information, transportation distance information, and size information in the direction in which the document is sent are used.

Thereafter in step S628, t1 and t2 are compared. If t1 is larger than t2, the process proceeds to step S629, and it is checked if the current document is in the top surface reading state, and if it is in the top surface reading state, the process proceeds to step S630.

It is checked in step S630 if the current document has come out of sensor 525, and if it has come out of sensor 525, the process proceeds to step S631. If the answers to steps S628, S629 and S630 are all "Yes", the following processing for a transportation processing from single feed tray 504, an essential point of the process according to the present invention is executed.

In step S631, flag A is set to "1", a processing to issue a priority printing request is executed in step S632, a processing to set the "currently transporting document" flag is executed in step S633, a processing of starting controlling transportation of the document from single feed tray 504 is executed, and then the subroutine is completed.

If one of the answers to steps S628, S629 and S630 is determined as "No", the process proceeds to step S612 as described above.

If it is determined in step S601 in FIG. 19 that no document is currently transported, the process proceeds to step S635 in FIG. 21, and it is confirmed if the "interrupt reading request" flag is set. If the flag is set, the flag of "currently transporting document" is set in step S636, a process of issuing a priority printing request is executed in step S637, and then a document transportation control from single feed tray 504 is started, and the subroutine is completed.

If it is determined in step S635 that the "interrupt reading request" flag is not set, it is confirmed if there is a document transportation request in step S639. The document transportation request is transmitted through a communication line from another CPU, and the request is issued by pressing start key 105 in FIG. 5 after a document is set at multi-document tray 501. If there is no such document transportation request in step S639, a processing of canceling the "currently transporting document" flag is executed in step S640, and after a processing of stopping driving in step S641, the subroutine is completed. If there is a document transportation request in step S639, the process proceeds to step S642, a processing of starting document transportation control from multi-document tray 501 is executed, and after the "currently transporting document" flag is set in step S643, the subroutine is completed.

Figure 22:
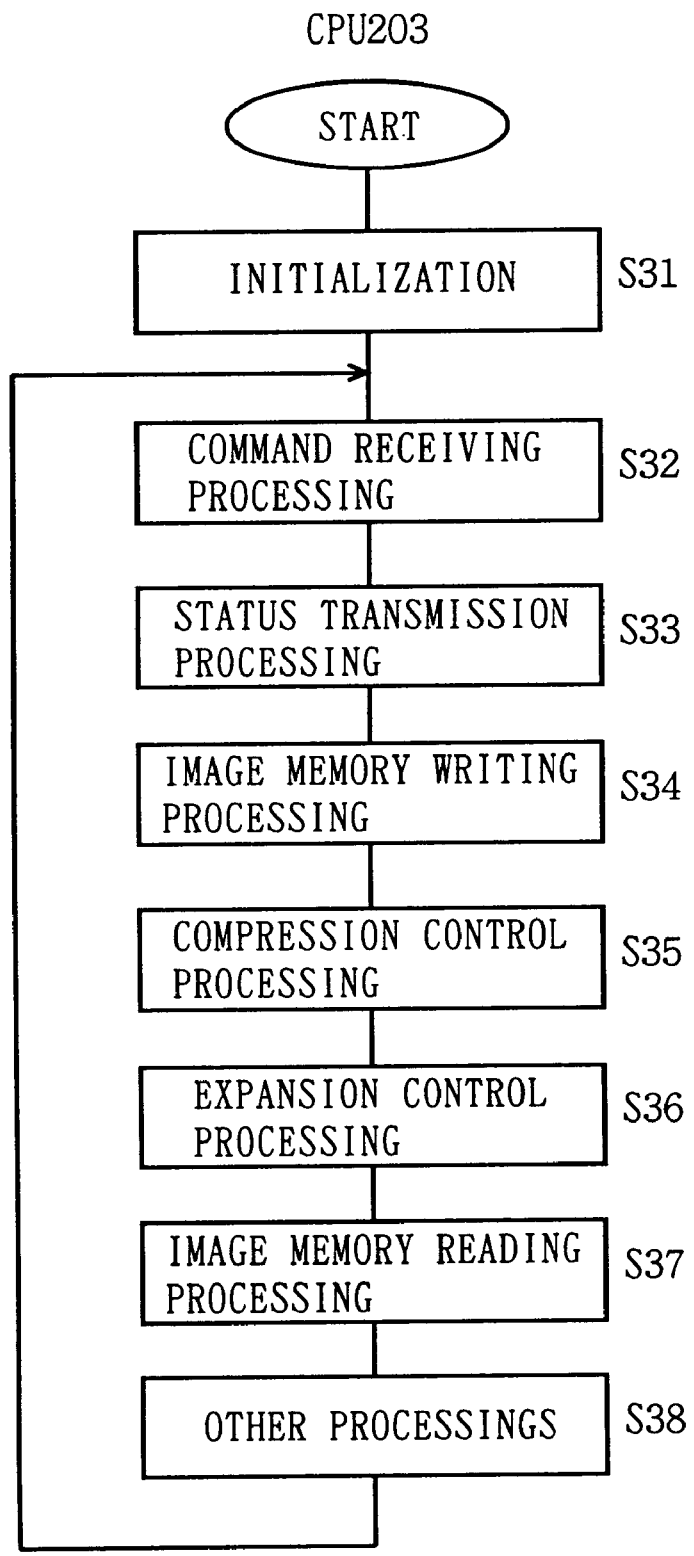
FIG. 22 is a main flow chart for use in illustration of the operation of a CPU 203 shown in FIG. 6.

FIG. 22 is a main flow chart for use in illustration of the operation of CPU 203 controlling memory unit 30.

After initialization (step S31), CPU 203 repeatedly executes a command receiving processing (step S32), a status transmission processing (step S33), an image memory reading processing (step S34), a compression control processing (step S35), an expansion control processing (step S30), an image memory reading processing (step S37), and other processings (step S38).

Figure 23:
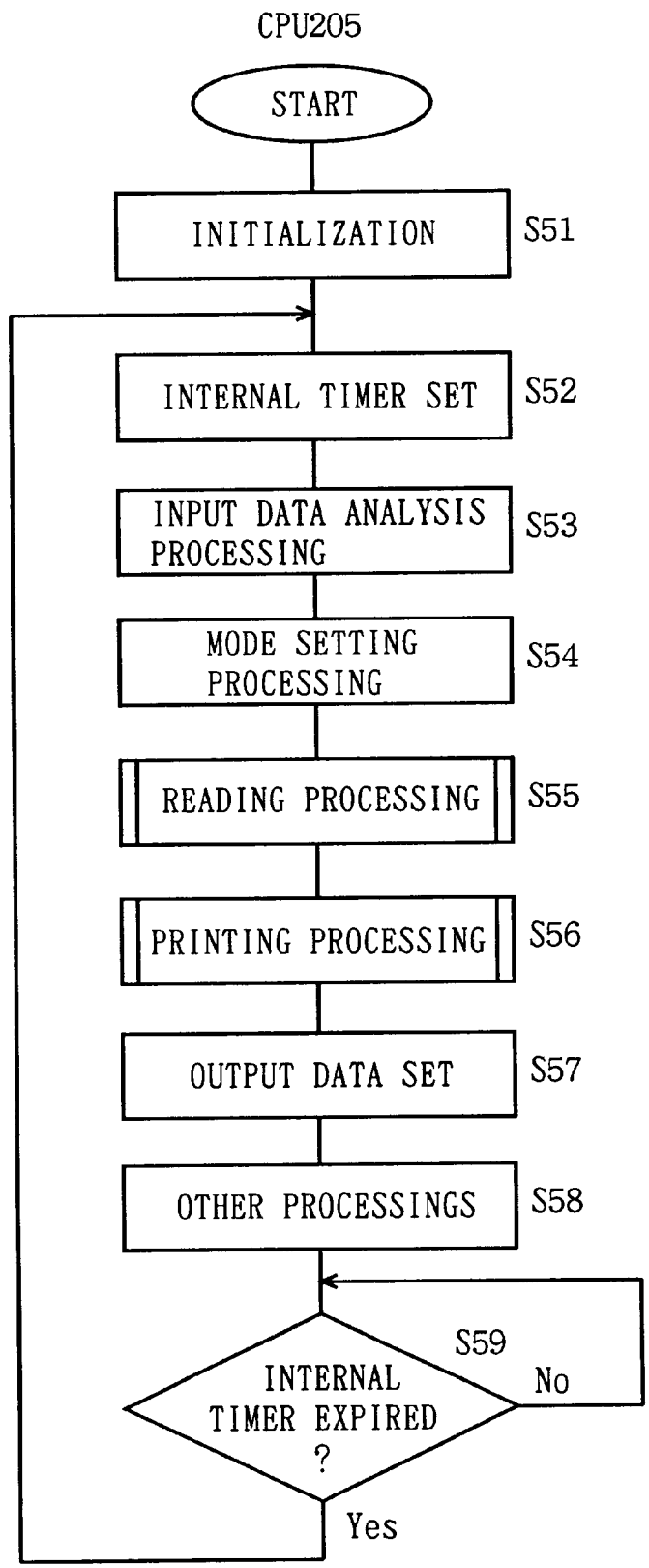
FIG. 23 is a main flow chart for use in illustration of the operation of a CPU 205 shown in FIG. 7.

FIG. 23 is a main flow chart for use in illustration of the operation of CPU 205 governing the control of copying machine 1.

After initialization (step S51), CPU 205 repeatedly executes setting of the internal timer (step S52), an input data analysis processing of checking input data from another CPU (step S53), a mode setting processing of determining an operation mode in response to an operation content (step S54), a reading processing (step S55), a printing processing (step S56), an output data set processing for making a command stand by on the communication board (step S57), other processings (step S58) and waiting for the internal timer to expire (step S59).

Figure 24:
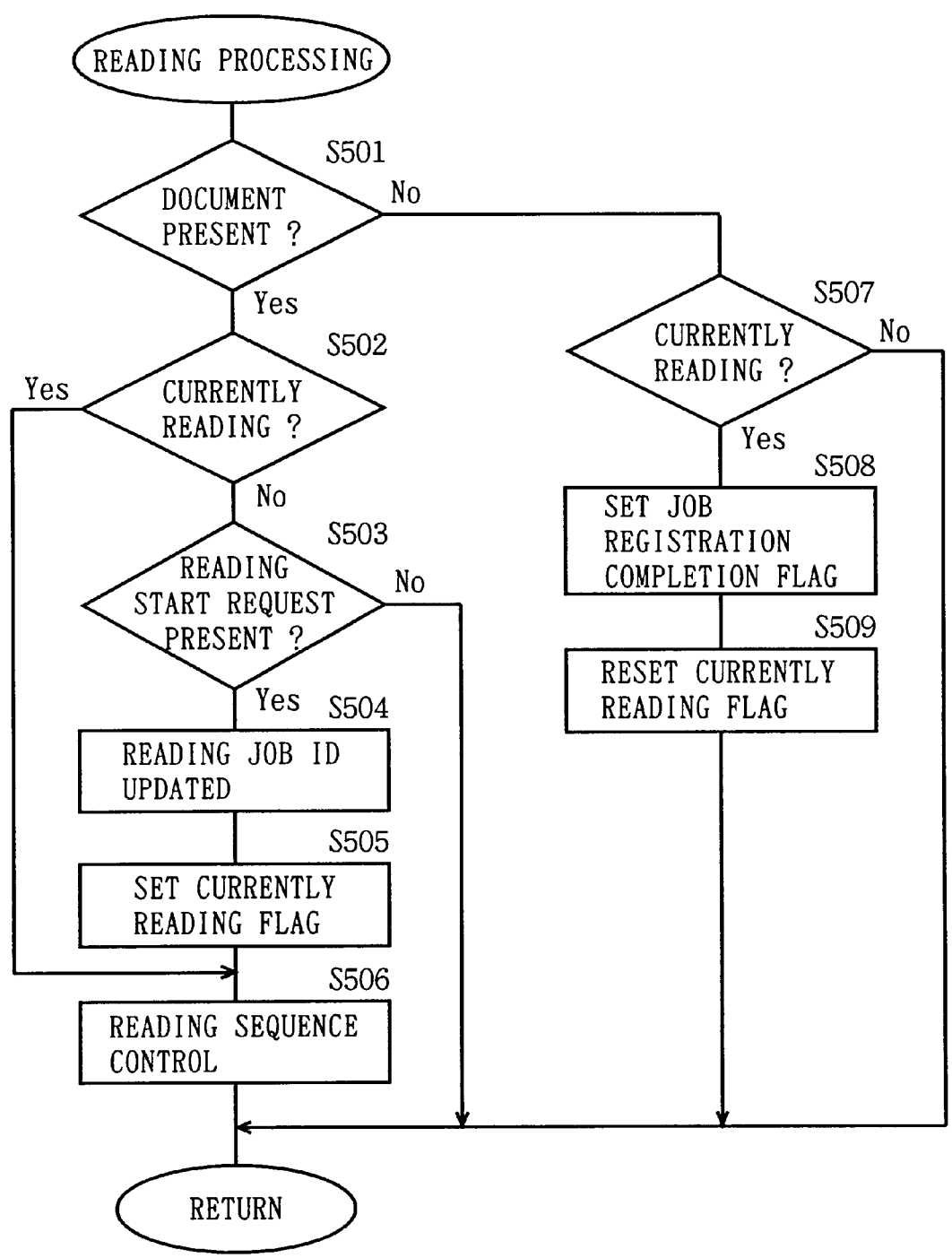
FIG. 24 is a flow chart for use in illustration of the operation of "DOCUMENT READING PROCESSING" in the main flow chart of CPU 205 shown in FIG. 23.

FIG. 24 is a flow chart for use in illustration of the operation of the document reading processing in steps S55 in FIG. 23.

In this routine, a job related to reading of a document is registered. It is first checked if there is a document, based on data from CPU 206 obtained in the input data analysis processing in step S53 (step S501), and if there is a document, the present state of the document is determined (step S502). If the document is not being read, it is determined if a reading start request from the operation panel 100 of CPU 201 has been received (step 503), and if there has been a reading start request, the reading job ID is updated (step S504), the "currently reading" flag is set (step S505), and a reading sequence control is made (step S506). In the reading sequence control, the above-described command and report are exchanged with CPUs 202 and 203, the images of a plurality of document sheets are compressed on a page-basis, and the data is sequentially registered in management table MT1 and code memory 35.

If there is no document in step S501, it is determined if reading is currently going on based on the state of the "currently reading" flag (step S507), if a reading is going on, job registration completion management table MT1 is set to 1 since reading out of the document has been completed (step S508), and "currently reading" is canceled (step S509).

Figure 25:
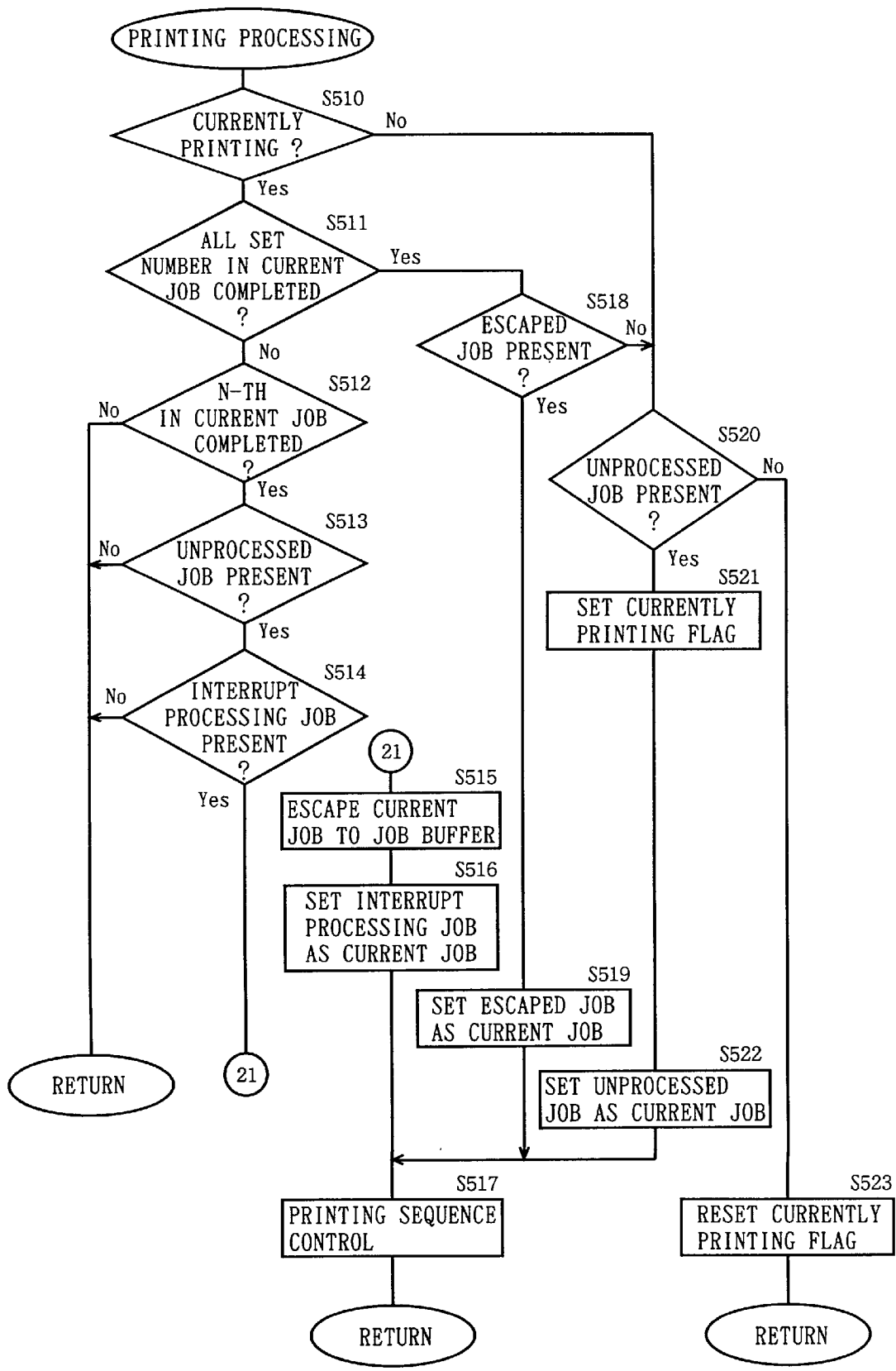
FIG. 25 is a flow chart for use in illustration of the operation of "PRINTING PROCESSING" in the main flow chart of CPU 205 shown in FIG. 23.

FIG. 25 is a flow chart for use in illustration of the printing processing in step S56 in FIG. 23. In the routine, processings of reading and switching jobs related to printing are executed.

Job Start Processing

It is first determined in step S510 whether a printing is going on, and if no printing is going, it is determined in step S520 if there is a job to be printed. If a job to be processed is present, "currently printing" is set in step S521, the above not-processed-job ID is set as current job in step S522. Furthermore, a printing sequence control is executed in step S517. By these processings, printing of a new job is initiated.

In the printing sequence control, commands and reports are exchanged with CPUs 203 and 204, image data is sequentially read out on a page-basis from management table MT1 and code memory 35, and the image data is subjected to expansion processing and printing.

Switching Processing at the End of Printing all sets in Job

If "currently printing" is determined in step S510, it is determined in step S511 if the current job has been completed for all the sets, and if the job has been completed, it is determined in S518 if there is an escaped job. If there is no escaped job, the same processing as the job start processing is executed. If there is an escaped job in step S518, current job ID is read out from an escape job buffer in step S519 and set. The escape job buffer will be described later.

If both escaped job and job to be processed are not present, "currently printing" is reset as the end of the entire job (step S523).

Switching Processing at the End of Printing N-th set in Job

If the current job has not been completed for all the sets in step S511, it is determined if the current job has been completed for the N-th printing in step S512. The N-th printing ranges from 1 to a set number minus 1, and corresponds to determination of the end or start of a set. If the N-th set has been completed, it is determined in step S513 if there is a job to be processed. If there is a job to be processed, it is determined in step S514 if a priority processing job by an interrupt processing is present in the job to be processed (a job with a priority printing request). If such a priority processing job is present in step S514, the following processing for switching the current job to the priority processing job is executed.

In step S515, the current job is registered in the escape job buffer. The escape job buffer stores job ID made less preferential to be printed and replaced with a priority processing when printing of the N-th set has been completed. The buffer is of an FIFO configuration, is read when the priority switching processing has been completed to jobs to be processed, and printing from the (N+1)-th set can be resumed.

Thereafter, in step S516, current job ID is set to priority processing job (interruption processing job) ID.

By the above processings, if there is a document interruption, a job being output is interrupted, and the interrupting processing can be preferentially output.

Note that in this embodiment, the interrupt processing is executed between sets, the invention is not limited to this, and the interrupt processing can be within a certain set.

In the above description of the embodiment, the present invention has been applied to the copying machine including document transport unit 500 of a document moving type, but the invention is not limited thereto and is similarly applicable to a copying machine including a document transport unit which sends a document sheet on platen glass 19 and moves a scanner for scanning the document.

Second Embodiment

Now, a copying machine according to a second embodiment of the invention will be described. The copying machine according to the second embodiment is different from copying machine 1 according to the first embodiment in the flow of a subroutine of document transport processing executed in the driving processing (step S66 in FIG. 17) in the main flow chart of CPU 206 governing the control of document transport unit 500.

Figure 26:
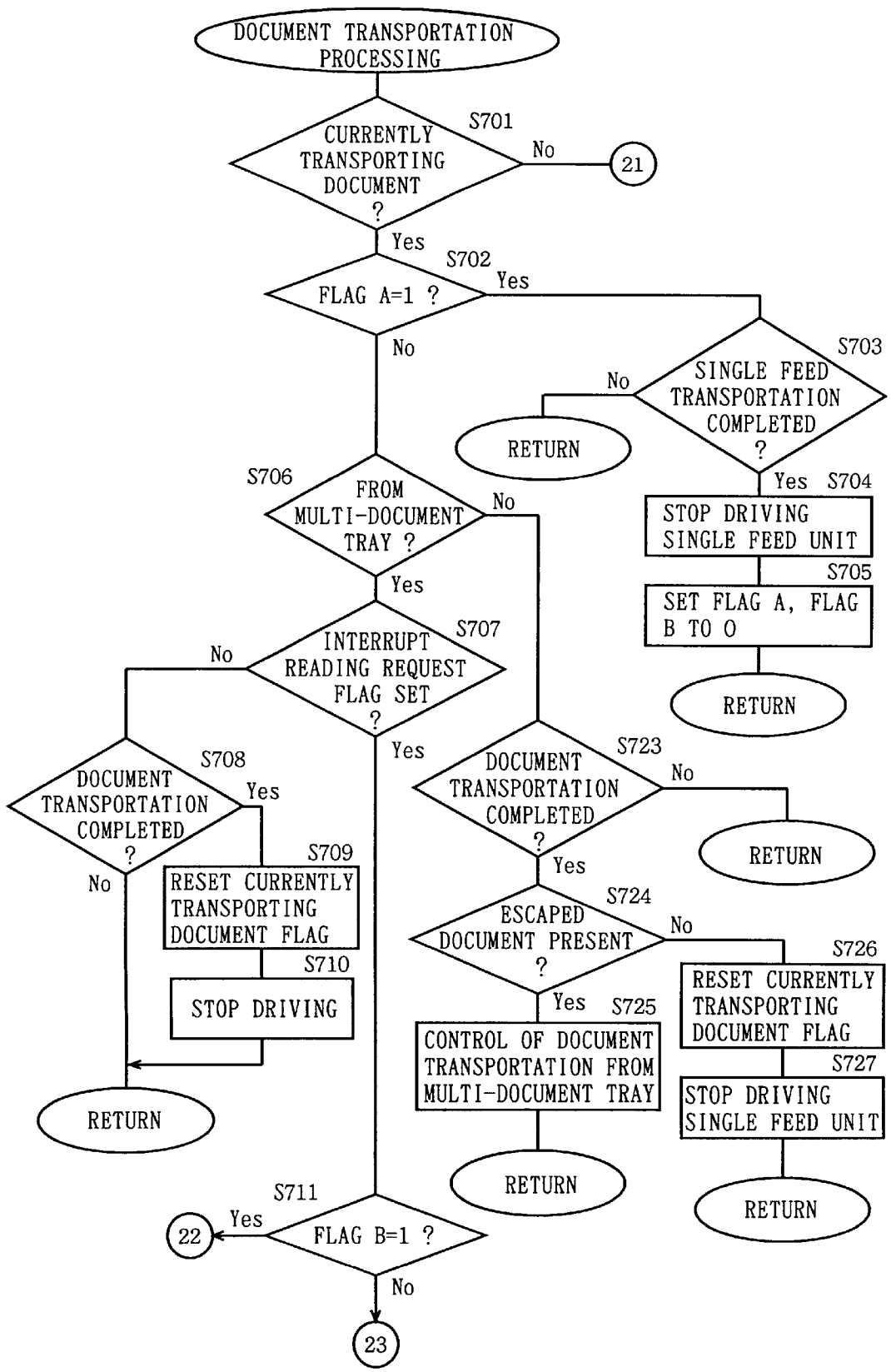
FIGS. 26 to 28 are flow charts for use in illustration of the subroutine of a document transport processing executed in "DRIVING PROCESSING" in the main flow chart of CPU 206 which governs the control of a document transport unit 500 in a copying machine according to a second embodiment of the invention.
Figure 27:
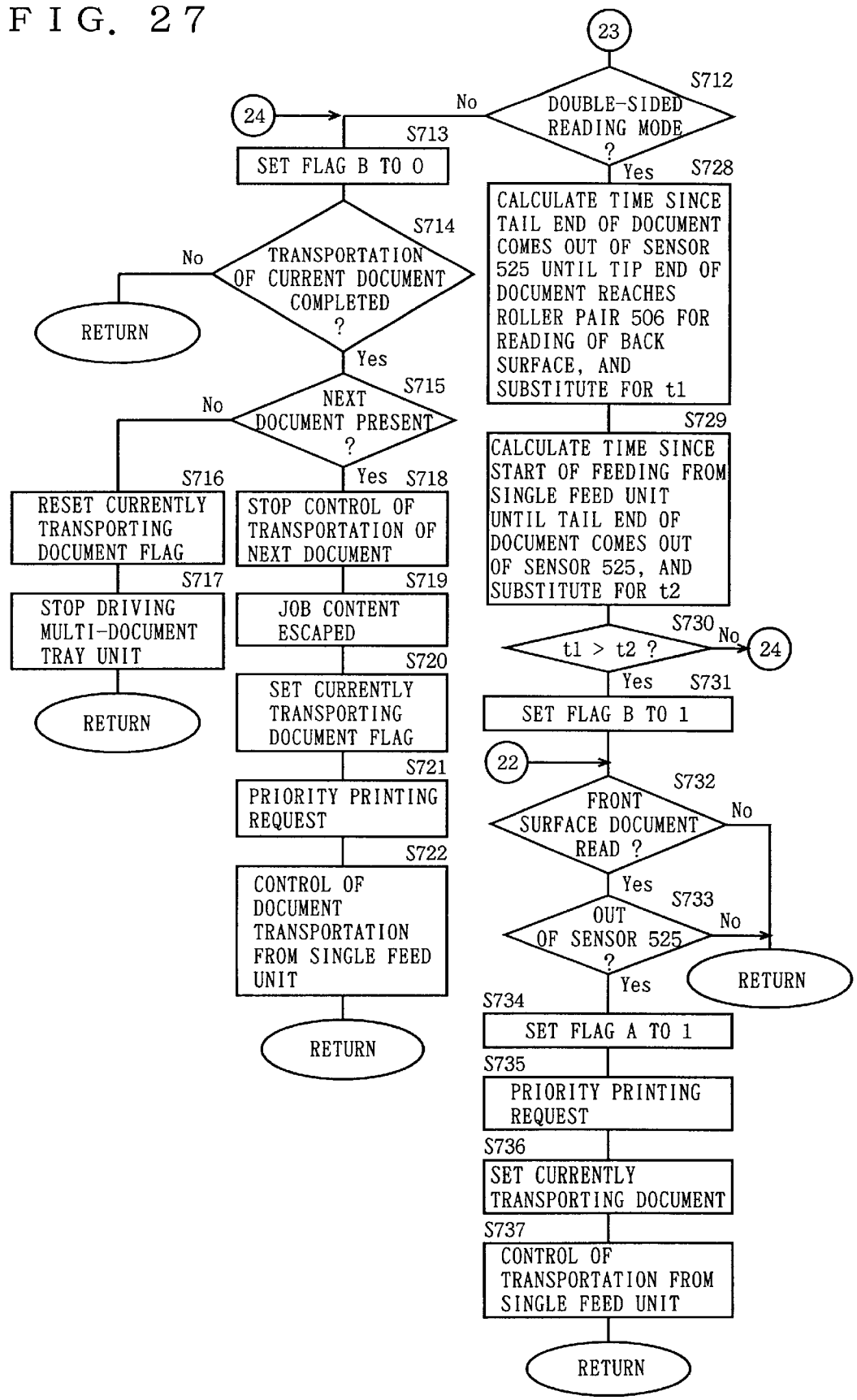
Figure 28:
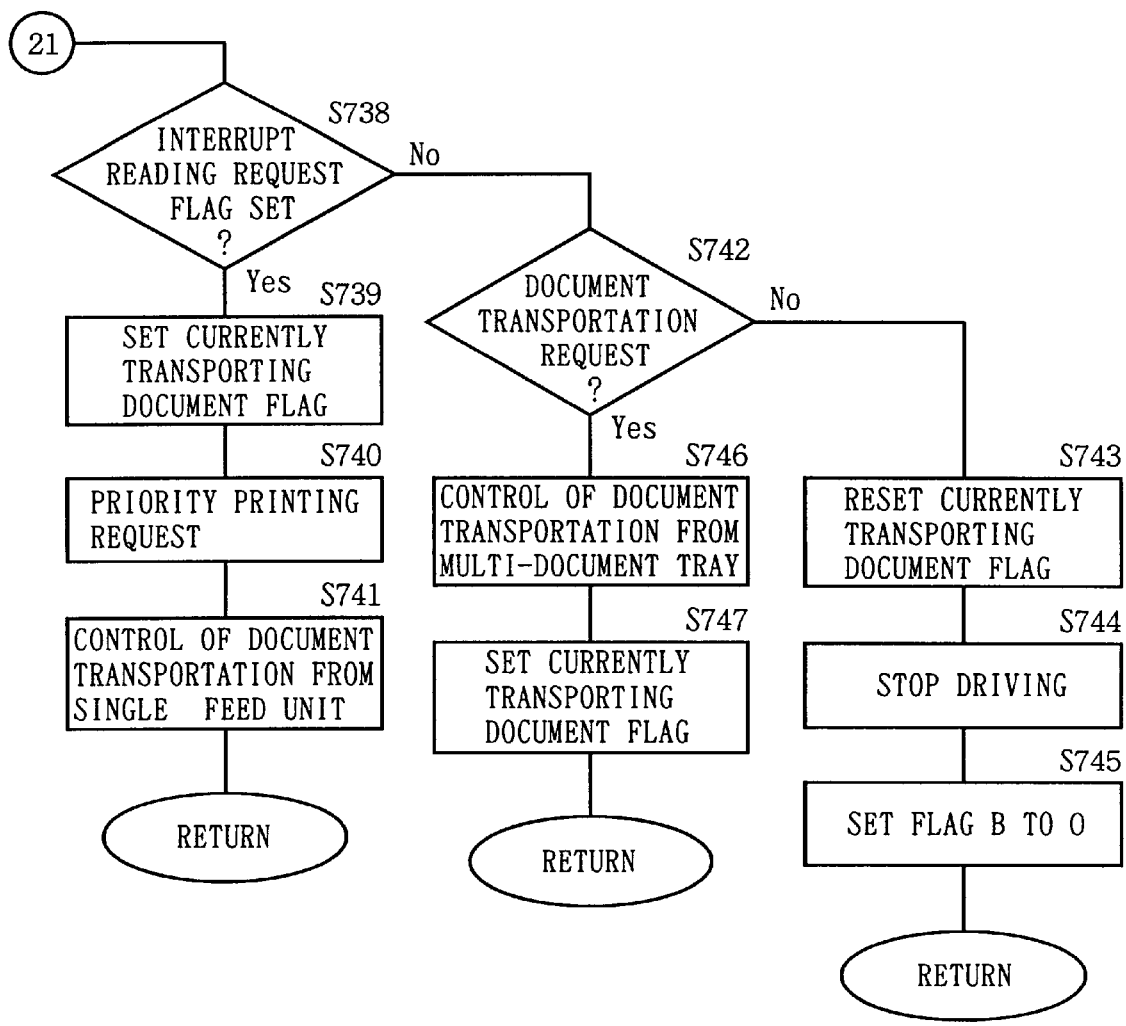

Referring to FIGS. 26 to 28, when the processing is entered, whether if a document is currently being transported is confirmed by determining the state of the "currently transporting document" flag. The "currently transporting document" refers to the process since the start of transporting the first document sheet until the 64 end of transporting all the document sheets placed at tray 501 in transporting a document from multi-document tray 501. If it is determined a document is currently being transported, the process proceeds to step S702, and it is checked if flag A is set to "1". Flag A is set when a document is inserted to single feed tray 504 during transport control from multi-document tray 501 and an interruption transport from single feed tray 504 is determined possible without lowering the efficiency of transporting the document from multi-document tray 501, an essential point in the process according to the present invention.

If it is determined in step S702 that flag A is set (to "1"), the process proceeds to step S703, and it is determined if the transportation from single feed tray 504 has been completed based on the output of sensor 516. If the transportation has not been completed, the subroutine is completed. If it is determined that the transportation has been completed, the process proceeds to step S704, a processing of stopping driving the single feed unit is performed, followed by a processing of setting flags A and B to "0" in step S705, thus completing the subroutine. Flag B is set when a document is inserted to single feed tray 504 during transportation control from multi-document. tray 501 and it is determined that an interruption transportation from single feed tray 504 can be achieved without lowering the efficiency of transporting the document from multi-document tray 501, an essential point in the process according to the present invention.

If it is determined in step S702 that flag A is not set to "1", the process proceeds to step S706, and it is determined if it is a transportation from multi-document tray 501. If the transportation is from multi-document tray 501, it is checked in step S707 if the "interrupt reading request" flag is set. The "interrupt reading request" flag is set when a document is placed in single feed tray 504 as shown in FIG. 18 and document insert detection sensor 519 detects the document. If the "interrupt reading request" flag is not set in step S707, the process proceeds to step S708, and it is determined if the document transportation has been completed. If the transportation has not been completed, the subroutine is completed as is, while if the document transportation has been completed, the "currently transporting document" flag is canceled in step S709, followed by a processing of stopping driving in step S710, and the subroutine is completed.

If it is determined in step S707 that the "interrupt reading request" flag is set, the processing proceeds to step S711, and it is checked if flag B is set to "1". If it is determined that flag B is set to "1", the process proceeds to step S732 in FIG. 27. The processings after step S732 will be described later. If it is determined that flag B is not set to "1", the process proceeds to step S712, and it is determined if the document reading mode from multi-document tray 501 is the double-sided document reading mode. The mode confirmation is implemented by referring to data available from another CPU in the command receiving processing in step S63. If it is not the double-sided document reading mode, it shows that the document transportation cannot be executed from single feed tray 504 without lowering the efficiency of transporting the document from multi-document tray 501, and the process proceeds to step S713 and on.

In step S713, flag B is set to "0", then the process proceeds to step S714. In step S714, it is checked if the transportation of the current document has been completed, and if the transportation has not been completed, the subroutine is completed. If the document transportation has been completed in step in S714, it is determined in step S715 if the next document sheet is present based on the output of sensor 515. If there is no following document sheet, the "currently transporting document" flag is reset in step S716, a processing of stopping driving multi-document tray 501 is executed in step S717, and then the subroutine is completed.

If it is determined in step S715 that the next document sheet is present, the processing of stopping controlling current transportation of the next document sheet is executed in step S718, and in step S719 the content of the job in the stopped stage is escaped. Then in step S720, the "currently transporting document" flag is set, and a processing of issuing a priority printing request is executed in step S721. The priority printing request requests a read image to be preferentially output regardless of the order of reading, and such a request is used in the processing of CPU 205. Then in step S722, a document transportation control is started from single feed tray 504, and the subroutine is completed. Thus, during transporting a document from multi-document tray 501, an interrupt processing can be achieved with a document being set to single feed tray 504.

In step S706 in FIG. 26, if it is determined that the document is not from multi-document tray 501, the process proceeds to S723, it is determined if the transportation of the document has been completed, and if the transportation has not been completed, the subroutine is completed. If the transportation has been completed, it is confirmed in step S724 if there is a document reading job which has been escaped. If there is a job which has been escaped, the process proceeds to step S725, a processing of starting a document transport control from multi-document tray 501 is executed, and then the subroutine is completed. Thus, after the document transportation from single feed tray 504 has been completed, transportation of the interrupted document is automatically resumed. It is automatically resumed herein, but it may be resumed by pressing start key 106 in FIG. 5. It is determined in step S724 that there is no escaped document, the "currently transporting document" flag is executed in step S726, followed by a process of stopping driving the single feed unit in step S727, and then the subroutine is completed.

If it is determined that the mode is the double-sided document reading mode in step S712 in FIG. 27, the process proceeds to step S728, and the time period since the tail end of the document comes out of sensor 525 until the tip end of the document reaches roller pair 506 for reading of the back surface is calculated, and the calculated value is substituted for "t1". For calculating the time period, document transport speed (or set magnification) information or transport distance information are used.

Then in step S729, the time period since the start of feeding a document from single feed tray 504 until the tail end of the document comes out of sensor 525 is calculated, and the calculated value is substituted for "t2". For calculating the time period, document transport speed (or said magnification) information, transport distance information or document size information in the direction in which the document is fed are used.

Thereafter, in step S730, t1 and t2 are compared. If t1 is larger than t2, the process proceeds to step S731, flag B is set to "1", then the process proceeds to step S732, and it is checked if the present document is in the front surface reading state. If it is the front surface reading state, the processing proceeds to step S733.

In step S733, it is checked if the present document has been out of sensor 525, and if it has been out of the sensor, the process proceeds to step S734. If the answers to steps S730, S732, and S733 are all "Yes", the following processing for a transportation processing from single feed tray 504 is executed.

In step S734, flag A is set to "1", in step S735 a priority printing request is issued, in step S736 the "currently transporting document" flag is set, in step S737 a processing of starting controlling transportation of a document from single feed tray 504 is executed, and then the subroutine is completed.

If it is determined in step S730 that t1>t2 is not established, the process proceeds to step S713 as described above. If the answers in steps S732 and S733 are both "No", the subroutine is completed. If it is determined that a document is not currently being transported in step S701, the process proceeds to step S738, the set state of the "interrupt reading request" flag is confirmed, and if the flag is set, the "currently transporting document" flag is set in step S739, a priority printing request is issued in step S740, and then a document transportation control from signal feed tray 504 is started in step S741, and the subroutine is completed.

If it is determined in step S738 that there is no interrupt reading request, it is confirmed in step S742 if there is a document transportation request. The document transportation request is transmitted through a communication line from another CPU, and issued by pressing start key 105 in FIG. 5 after a document is set to multi-document tray 501. If there is no such document transportation request in step S742, the "currently transporting document" flag is canceled in step S743, a processing of stopping driving is executed in step S744, flag B is set to "0" in step S745, and then the subroutine is completed. If there is a document transportation request in step S742, the process proceeds to step S746, a processing of starting a document transportation control from multi-document tray 501 is executed, the "transporting document" flag is set in step S747, and the subroutine is completed.

Note that the present invention is by no means limited to these embodiments, and may be in any form which brings about the same effects.

Third Embodiment

Figure 29:
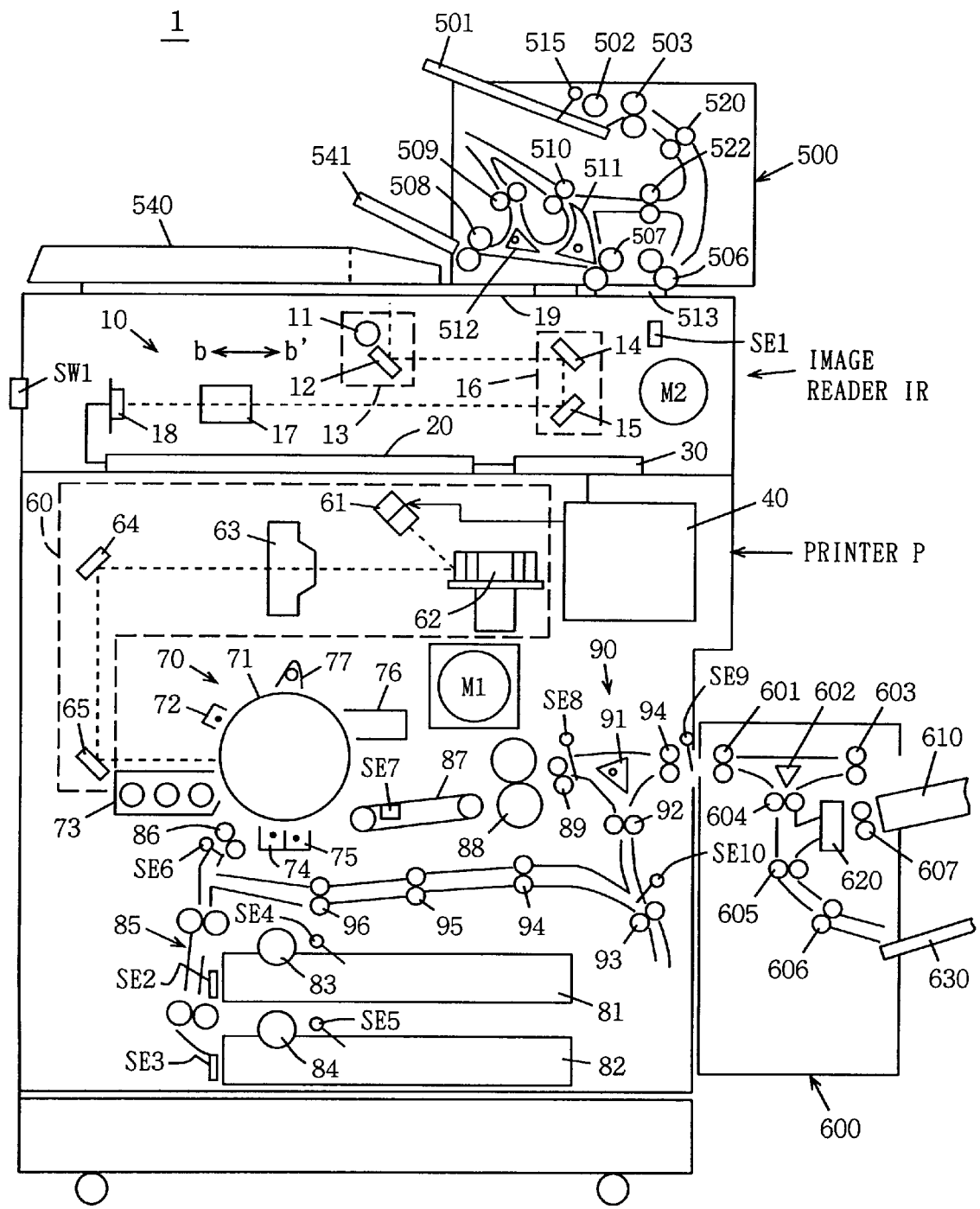
FIG. 29 is a cross sectional view showing the configuration of a copying machine according to a third embodiment of the invention.
Figure 30:
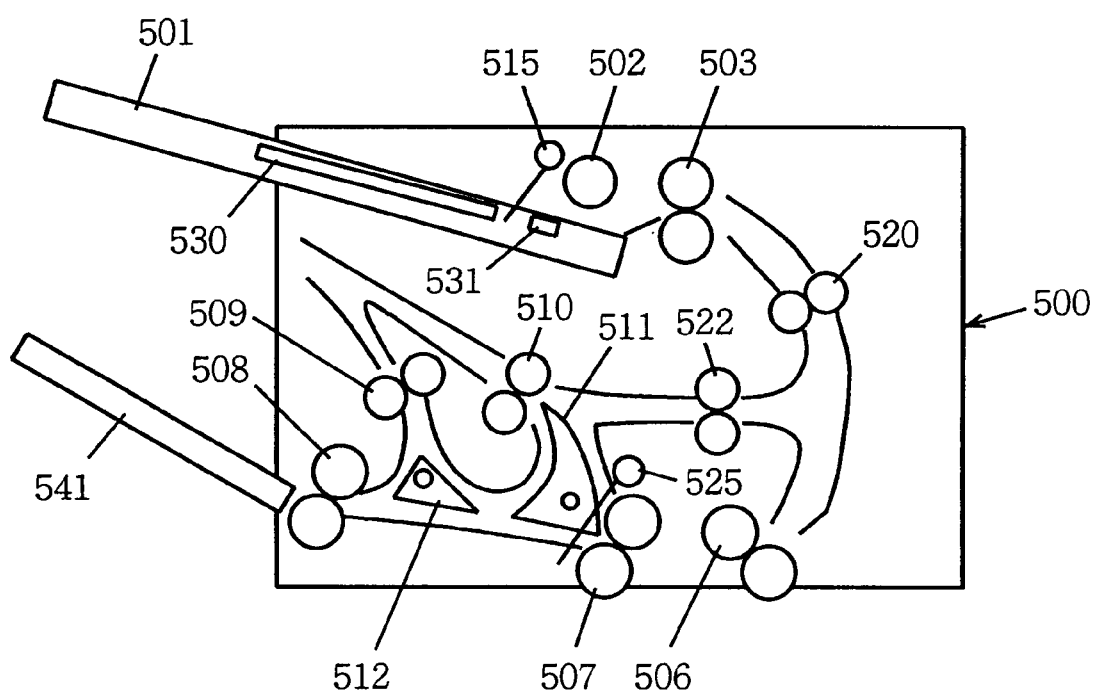
FIG. 30 is a cross sectional view showing the configuration of a document transport unit in the copying machine shown in FIG. 29.

FIG. 29 is a cross section of a digital copying machine 1 according to a third embodiment of the invention, and FIG. 30 is a cross section of a document transport unit 500 in FIG. 29.

Since the image reader IR, printer P and finisher 600 of the copying machine are the same as those in the copying machine shown in FIG. 1, the description will not be repeated.

Document transport unit 500 includes a multi-document tray 501 for setting a plurality of document sheets, a document insert detection sensor 515, a document feed roller 502, a document feeding roller 502, document transport roller pairs 503, 520, and 522, document sending roller pairs 506 and 507, a document discharge roller pair 508, a document discharge tray 541, a document reversing roller pair 510 capable of rotating normally and reversely, a document page collating roller pair 509 capable of rotating normally and reversely, a document reversing switching claw 511, a document page collating switching claw 512, and a sensor 525 for detecting the tail end of a document being out of roller pair 507.

When document sheets are set to multi-document tray 501, the surfaces to be copied are set facing upward. When a document is read, a first scanner 13 moves to the reading position and stops, then the document is transported by document sending roller pairs 506 and 507 at a fixed speed for reading of document information.

If only a single side of a document set at multi-document tray 501 is read, the document fed by document feeding roller 502 is sent to the document reading position through document transport roller pairs 503 and 520 and the document sending roller pair 506, and is discharged by document discharge roller pair 508 through document sending roller pair 507. More specifically, the document sheet is discharged with the surface to be copied facing upward. At the time, document reversing switching claw 511 and document page collating switching claw 512 are controlled by solenoids which are not shown such that the document passes through the above path.

Figure 31A:
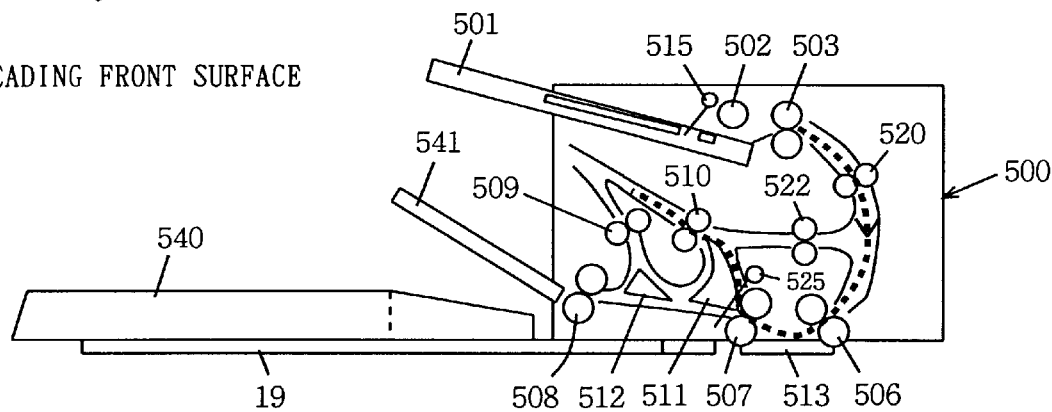
FIGS. 31A to 31C are views for use in illustration of a double-sided document reading mode in the copying machine shown in FIG. 29.

If both sides of a document set in multi-document tray 501 are read, as shown in FIG. 31A, the document fed by document feeding roller 502 is sent to the document reading position by document transport roller pairs 503, 502 and document sending roller pair 506, and then sent to document reversing roller pair 510 through document sending roller pair 507 by the operation of document reversing switching claw 511.

Figure 31B:
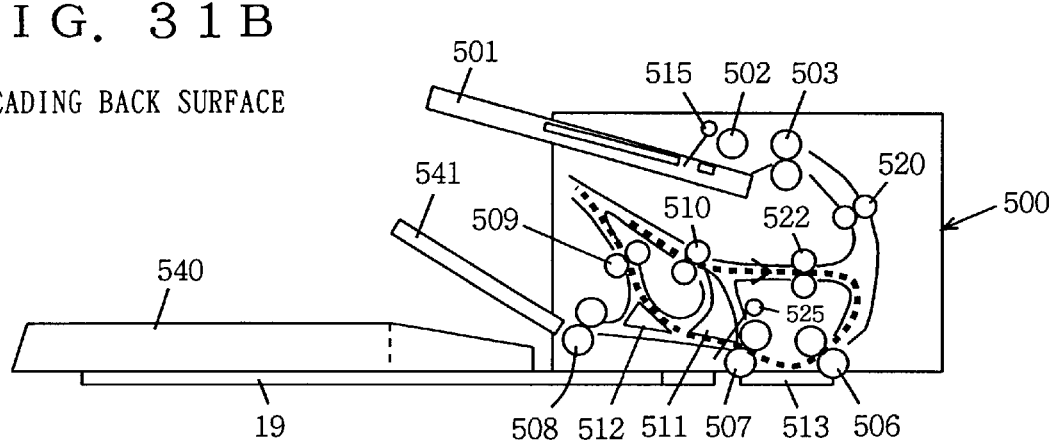

After the document is transported for a prescribed length by document reversing roller pair 510 in order to read the back surface, as shown in FIG. 31B, document reversing roller pair 510 reversely rotates, to allow the document to be sent to document sending roller pair 506 through document transport roller 522. Thereafter, via the document reading position, the document passes through document sending roller pair 507, and sent to document page collating roller pair 509 by the operations of document reversing switching claw 511 and document page collating switching claw 512.

Figure 31C:
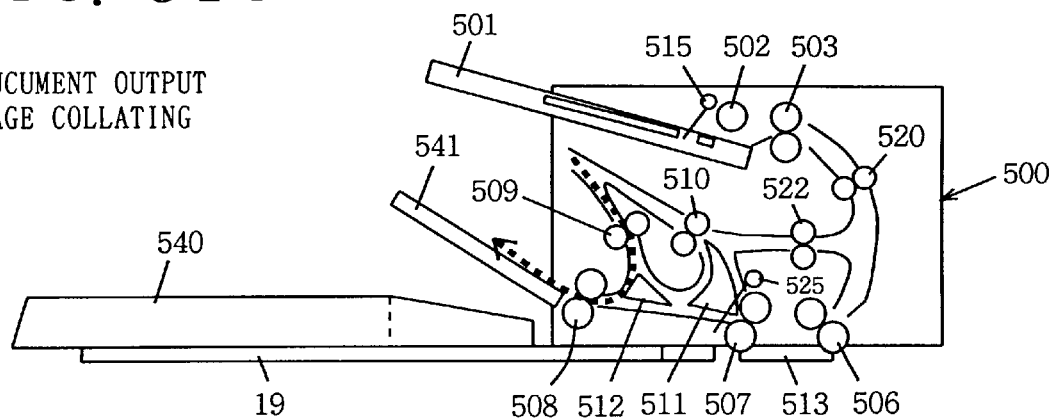

After the document is transported for a prescribed length by document page collating roller pair 509, as shown in FIG. 31C, document page collating roller pair 509 reversely rotates, and the document is sent to document discharge roller pair 508 by the function of document page collating switching claw 512, and discharged onto document discharge tray 541. More specifically, the document is discharged with its front surface facing downward. Thus, the document sheets are collated.

Figure 32:
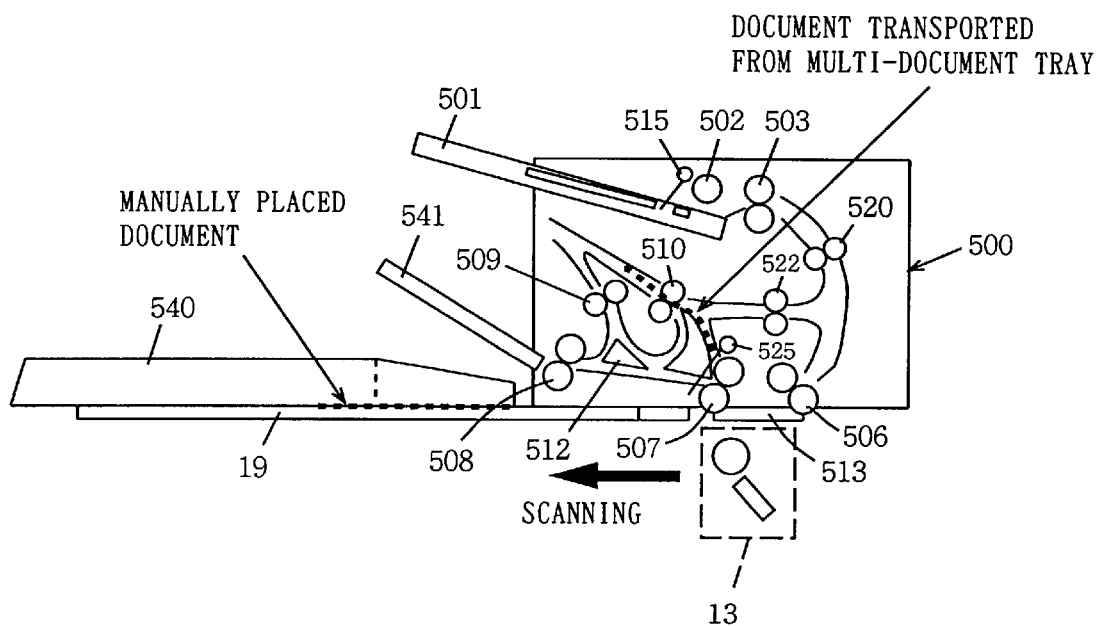
FIG. 32 is a view for use in illustration of an interrupt reading processing of a manually placed document in the copying machine shown in FIG. 29.

If a document placed on platen glass 19 is read during switching from the front surface to the back surface of a both-sided document, an essential point of the process according to the present invention, as shown in FIG. 32, scanner 13 starts scanning platen glass 19 in the timing in which the reading of the document front surface has been completed and the tail end of the document comes out of sensor 525.

Document transport unit 500 further includes a sensor group 530 for detecting the length of a document placed on multi-document tray 501, and a sensor group 531 for detecting the width of a document placed in multi-document tray 501.

Figure 33:
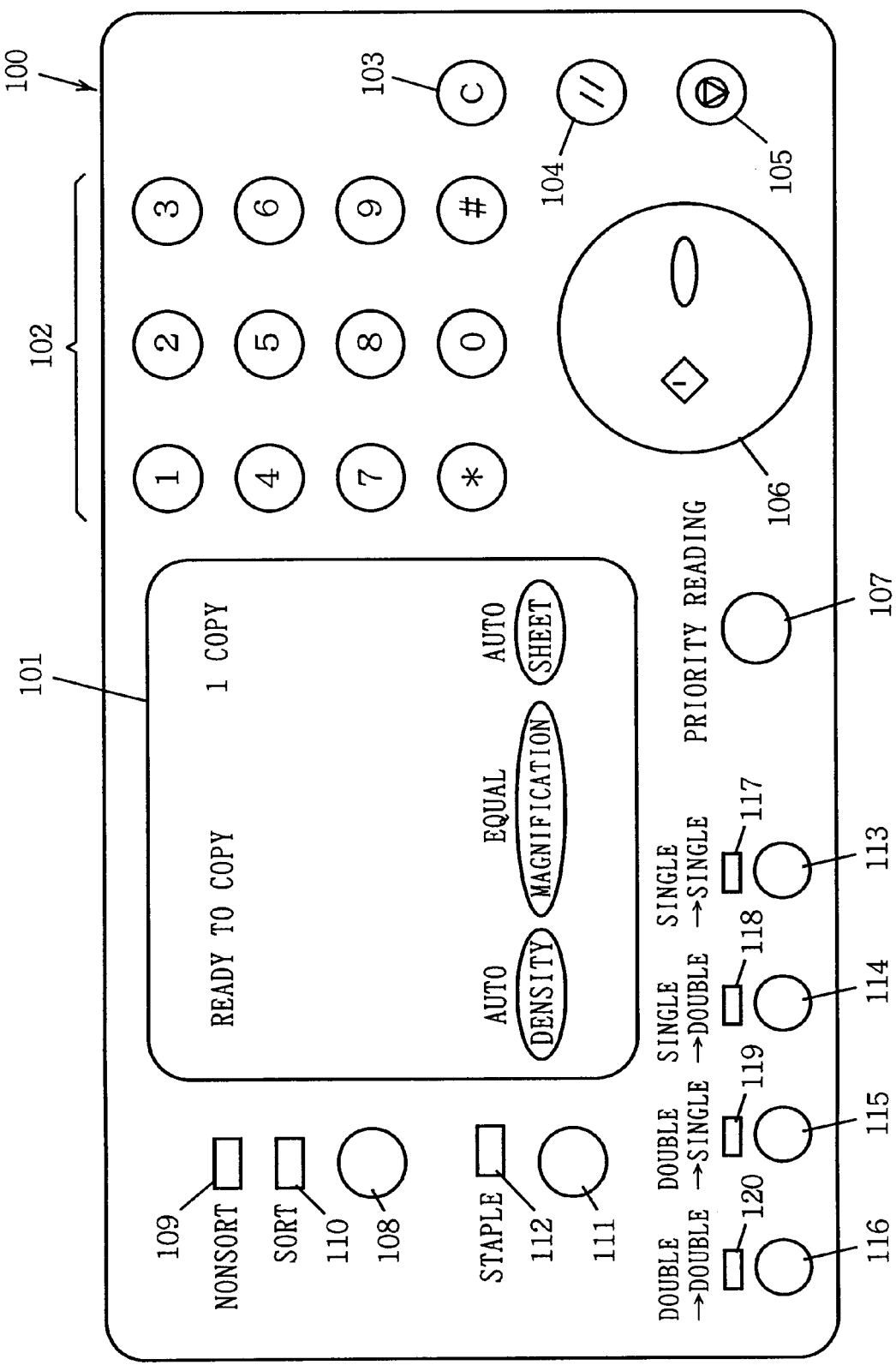
FIG. 33 is a plan view showing an operation panel in the copying machine shown in FIG. 29.

FIG. 33 is a plan view showing an operation panel 100. Operation panel 100 includes a liquid crystal touch panel 101 for indicating states and setting various modes, a ten key 102 used to input a numerical condition for copying (number or magnification), a clear key 103 for returning the numerical condition to standard values, a panel reset key 104 for initializing a copying mode, a stop key 105 for instructing stopping copying, a start key 106 to instruct starting copying, and a priority reading key 107 for preferentially reading a certain document. Operation panel 100 further includes a mode setting key 108 to set a non-sort or sort mode, a display portion 109 to show that the non-sort mode is selected, a display portion 110 to show that the sort mode is selected, a mode setting key 111 for setting a staple mode, and a display portion 112 to show that the staple mode is selected. Operation panel 100 further includes keys 113 to 116 to select to a mode for the relation between a document and an output, in other words, a key 113 for setting a single-sided copying from a single-sided document, a key 114 for setting a both-sided copying from a single-sided document, a key for setting a single-sided copying from a both-sided document, a key 116 for setting a both-sided copying from a both-sided document, and display portions 117 to 120 for displaying that keys 113 to 116 are selected, respectively.

Liquid crystal touch panel 101 displays various states of copying machine 1 such as the near empty state of accommodated sheets, an empty indication, a jam indication, a trouble indication, the operation mode of copying machine 1 such as exposure level and magnification, and other various indications, and can enter inputs to select an operation mode.

The control unit 200 of copying machine 1 has the same configuration as that shown in FIGS. 6 to 8.

The configuration of image processing unit 20 is the same as that in FIG. 9.

The configuration of memory unit 30 is the same as that in FIG. 10.

Management table MT1 is the same as that in FIG. 11.

The relation between management table MT1 and code memory 35 is the same as that in FIGS. 12A and 12B.

The sequence of a memory writing operation is largely the same as that in FIG. 13.

The sequence of a memory reading operation is largely the same as that in FIG. 14.

Now, the operation of each of CPUs 201 to 206 will be described by referring to the flow charts to more clearly define operation of copying machine 1.

A main flow chart for use in illustration of the operation of CPU 201 controlling operation panel 100 is the same as that in FIG. 15.

Figure 34:
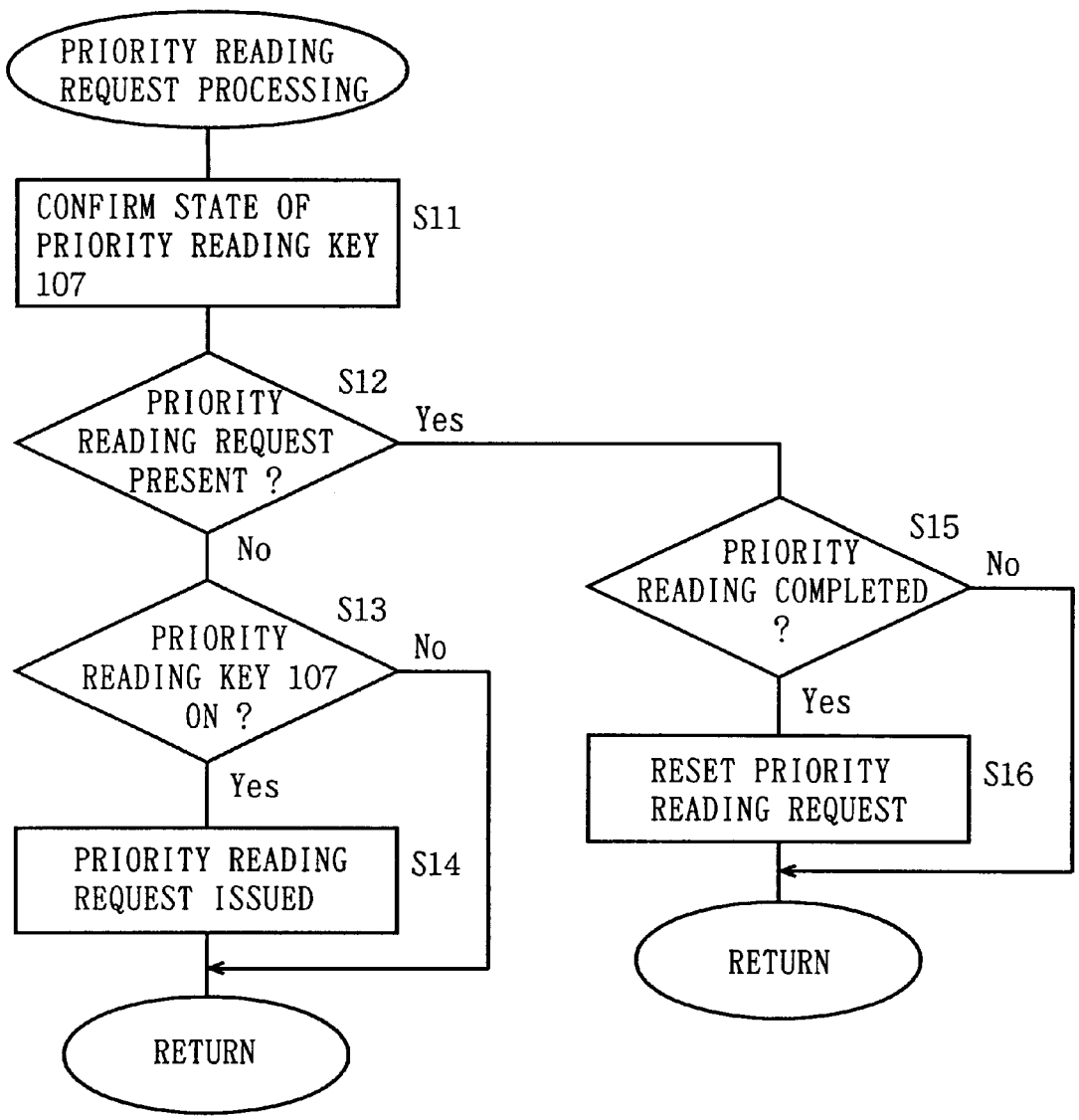
FIG. 34 is a flow chart for use in illustration of the subroutine of a priority reading request processing executed in a main flow chart of the operation of CPU 201.

FIG. 34 is a flow chart showing a subroutine in a priority reading request processing executed in a key input processing (step S3) in the main flow chart of CPU 201 governing the control of operation panel 100.

When the processing is entered, a processing of confirming the state of priority reading key 107 is executed in step S11. Then it is determined in step S12 if there is a priority reading request. If it is determined in step S12 that there is no priority reading request, the process proceeds to step S13, and it is checked if priority reading key 107 has been turned on. If it is determined that the key has been turned on, the process proceeds to step S14, a priority reading request is issued, and the subroutine is completed. The priority reading request is used in the processings of CPUs 202 and 206. If priority reading key 107 has not been turned on in step S13, the subroutine is completed.

If it is determined that there is a priority reading request in step S12, the processing proceeds to step S15, and it is confirmed if the priority reading processing has been completed. If the processing has not been completed, the subroutine is completed.

If it is determined in step S15 that the priority reading processing has been completed, a processing of canceling the priority reading request is executed in step S16, and the subroutine is completed.

A main flow chart for use in illustration of the operation of CPU 204 controlling printer P is the same as that in FIG. 16.

A main flow chart for use in illustration of the operation of CPU 206 governing the control of document transport unit 500 is the same as that in FIG. 17.

Figure 35:
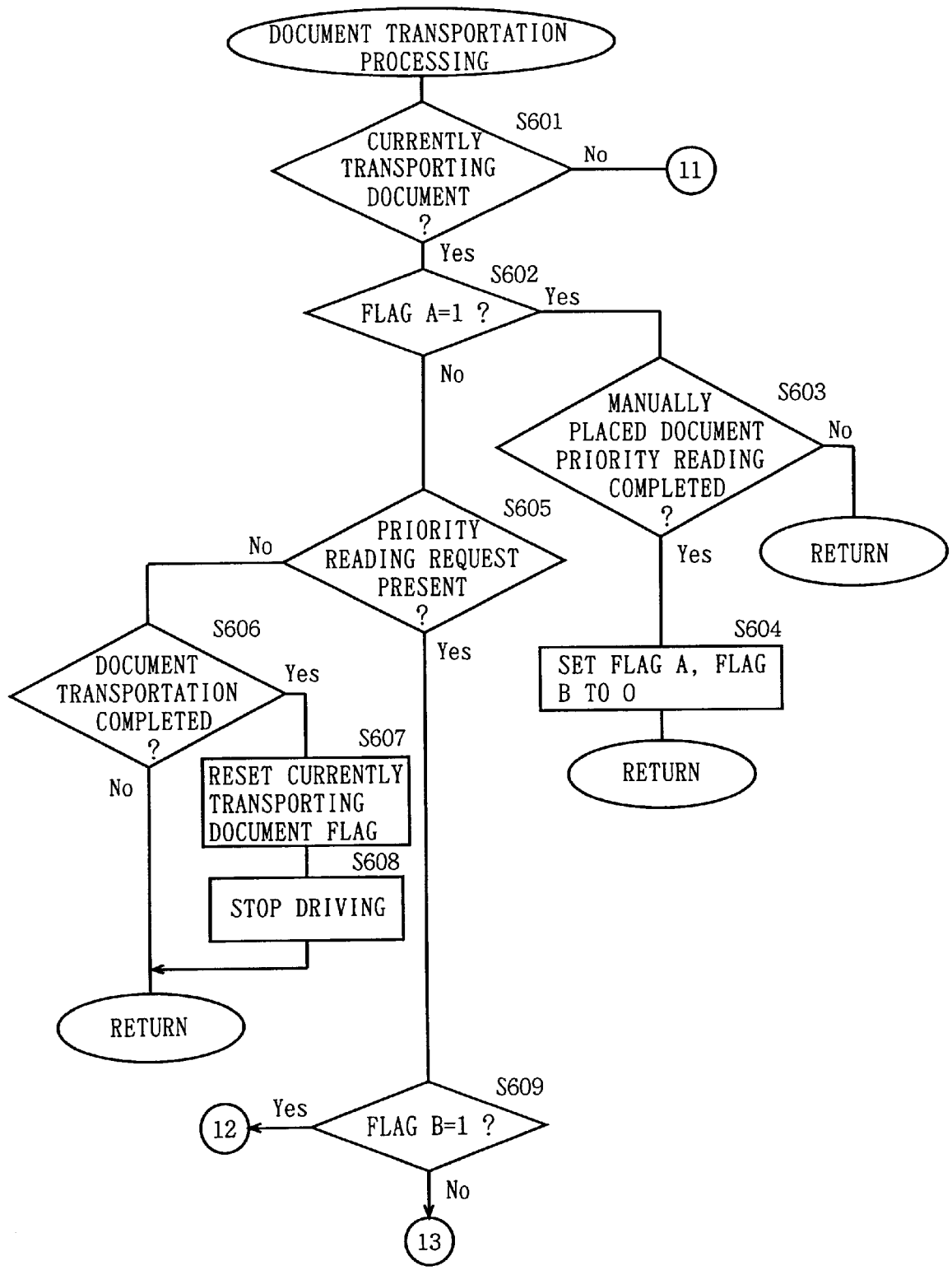
FIGS. 35 to 37 are flow charts for use in illustration of the subroutine of a document transport processing executed in "DRIVING PROCESSING" in a main flow chart of CPU 206.
Figure 36:
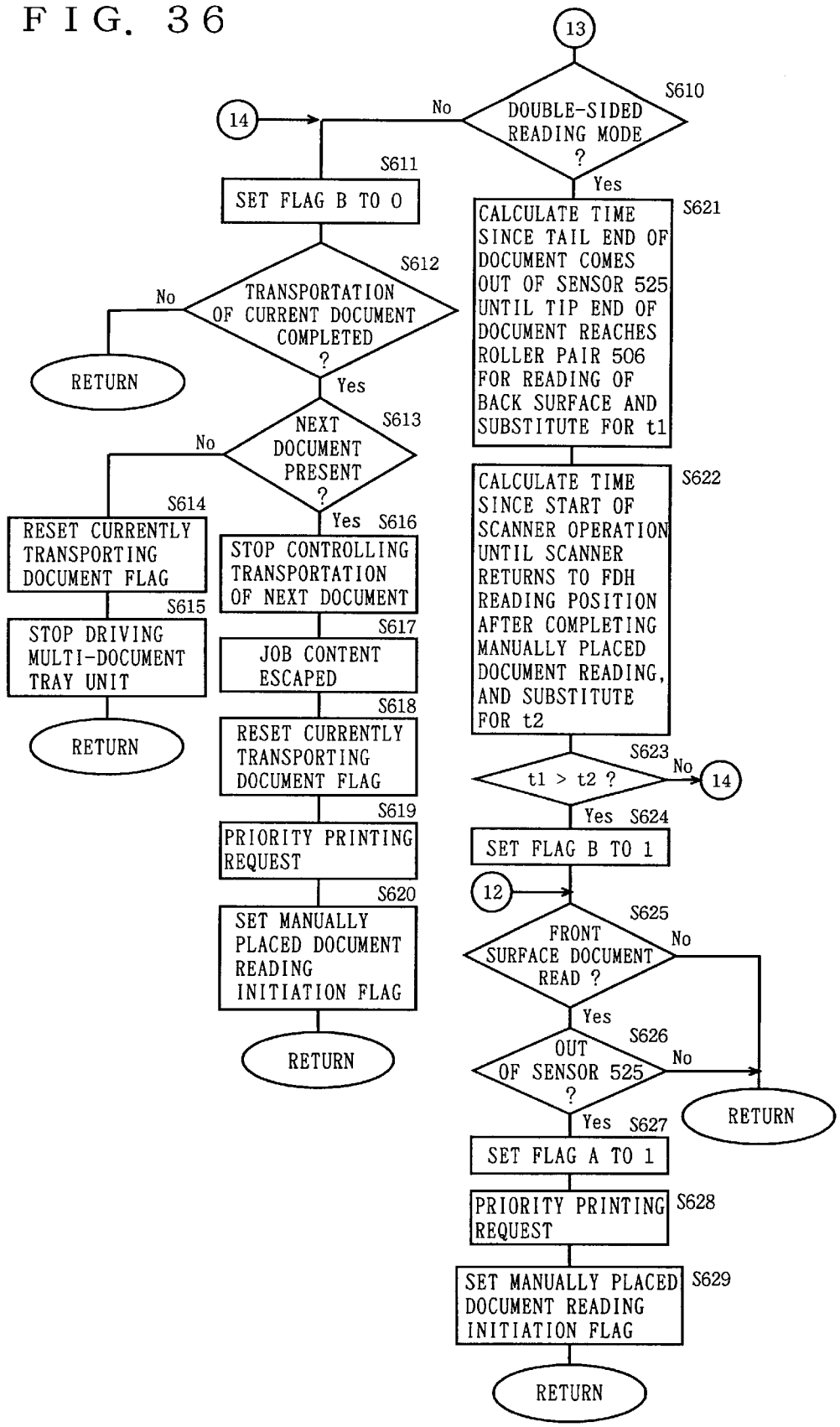
Figure 37:
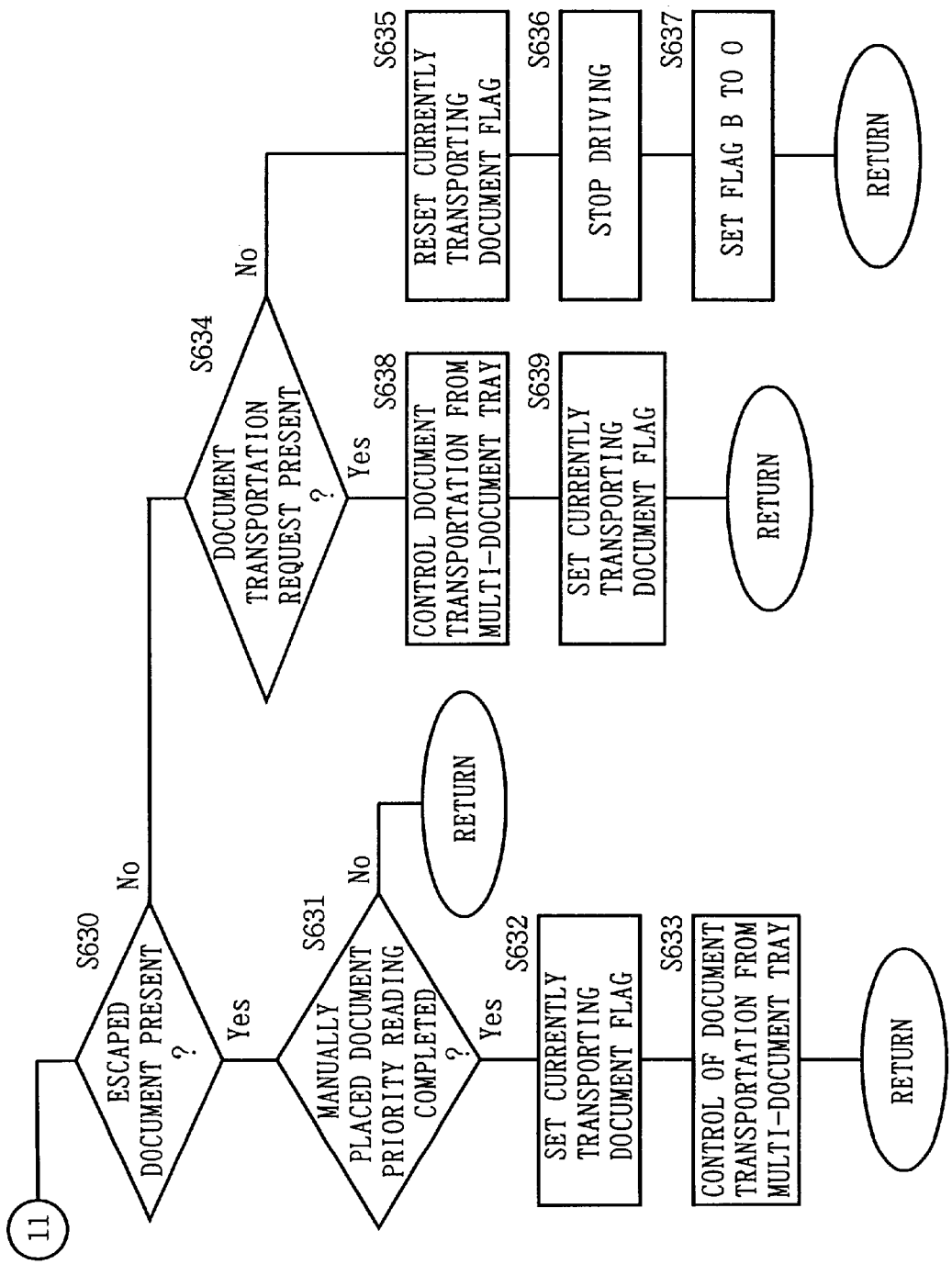

FIGS. 35 to 37 are flow charts for use in illustration of a subroutine of a document transport processing executed in a driving processing (step S66) in the main flow chart of CPU 206 governing the control of document transport unit 500.

When the processings entered, it is first confirmed in step S601 if a document is currently being transported, by determining the state of the "currently transporting document" flag. The "currently transporting document" basically refers to the process since the start of transporting the first document sheet until all the document sheets placed at tray 501 have been transported in the document transportation from multi-document tray 501. If it is determined that a document is currently being transported, the process proceeds to step S602, and it is checked if flag A is set to "1". Flag A is set when a document is placed at a manually placing position (between platen glass 19 and document cover 540) during controlling transportation from multi-document tray 501, priority reading key 107 is pressed, and an interrupt reading of the document manually placed can be performed without lowering the efficiency of transporting the document from multi-document tray 501 which is an essential point of the process according to the invention.

If it is determined in step S602 that flag A is set to "1", the process proceeds to step S603, and it is confirmed if a priority reading from the manually placing position has been completed, if the reading has not been completed, the subroutine is completed. If the reading has been completed, the process proceeds to step S604, flag A and flag B are set to "0", and then the subroutine is completed. Flag B is set when a document is placed at the manually placing position during controlling transportation from multi-document tray 501 and priority reading key 107 is pressed and it is determined that an interrupt reading of the document manually placed can be made without lowering the efficiency of transporting the document from multi-document tray 501, the case essential to the process of the present invention.

If it is determined in step S602 that flag A is not set to "1", it is checked in step S605 if there is a priority reading request. The priority reading request is issued by pressing priority reading key 107 on operation panel 100 as shown in FIG. 34. If there is no priority reading request, the process proceeds to step S606, and it is checked if the document transportation has been completed, and if the transportation has been completed, the subroutine is completed. If the transportation has not been completed, "currently transporting document" is canceled in step S607, a processing of stopping driving is executed in step S608, and then the subroutine is completed.

If it is determined in step S605 that there is a priority reading request, the process proceeds to step S609, where it is checked if flag B is set to "1". If it is determined that flag B is set to "1", the process proceeds to step S625 shown in FIG. 36. The processings in and after step S625 will be described later. If it is determined that flag B is not set to "1", the process proceeds to step S610 in FIG. 36, and it is confirmed if the document reading mode from multi-document tray 501 is the both-sided document reading mode. If not in the both-sided document reading mode, it means that an interrupt reading of the document manually placed cannot be performed without lowering the efficiency of transporting the document from multi-document tray 501, and therefore the process proceeds to step S611 and on.

In step S611, flag B is set to "0", and then the process proceeds to step S612. It is checked in step S612 if the transportation of the current document has been completed, and if the transportation has not been completed, the subroutine is completed. If the document transportation has been completed in step S612, it is confirmed in step S613 if there is the next document sheet. If there is no following document, "currently transporting document" is canceled in step S614, a process of stopping driving multi-document tray 501 is executed in step S615, and the subroutine is completed.

If it is determined that there is the next document sheet in step S613, a process of stopping controlling transportation of the next document sheet is executed in step S616, and a process of escaping the content of a job in the stopped stage is performed in step S617. Then, in step S618, a process of canceling "currently transporting document" is executed, and a process of issuing a priority printing request is executed in step S619. The priority printing request requests a read image to be preferentially output regardless of the order of reading, and the request is used in the processing of CPU 205. Thereafter, in step S620, the start of reading a document manually placed is set, and the subroutine is completed. The setting of the start of reading the document manually placed is used in the processing of CPU 202. Thus, an interrupt processing by interrupting transportation of a document from multi-document tray 501 can be achieved when a priority reading request is issued.

If it is determined in step S610 that the mode is the double-sided document reading mode, the process proceeds to step S621, and the time period since the tail end of the document comes out of sensor 525 until the tip end of the document reaches roller pair 502 for reading of the back surface is calculated, and the calculated value is substituted for "t1". For calculating the time period, document transport speed (or set magnification) information or transport distance information are used.

Then in step S622, the time period since scanner 13 starts operating until scanner 13 returns to the FDA reading position after completing reading of a manually placed document is calculated, and the calculated value is substituted for "t2". For calculating the time period, the size of the manually placed document, the distance between the FDA reading position and the tip end of the manually placed document, and information such as scan speed are used.

Then, in step S623, t1 and t2 are compared. If t1 is larger than t2, the process proceeds to S624, flag B is set to "1", and then the process proceeds to step S62, where it is checked if the present document is in the front side reading state. If it is in the front side reading state, the process proceeds to step S626.

It is then checked in step S626 if the current document has been out of sensor 525, and if it has come out of the sensor, the process proceeds to step S627. If the answers to step S623, S625 and S626 are all "Yes", the following processing for a document reading processing of a manually placed document, an essential point of the process according to the present invention will be executed.

In step S627, flag A is set to "1" in step S628 a priority printing request is issued, in step S629 the start of reading a manually set document is set, and the subroutine is completed.

If it is determined that t1>t2 is not established in step S623, the process proceeds to step S611. If the answers to steps S625 and S626 are both "No", the subroutine is completed.

If it is determined in step S601 in FIG. 35 that a document is not currently being transported, the process proceeds to step S630 in FIG. 37, and it is checked in step S617 in FIG. 36 if there is a document which has been escaped in the processing in step S617. If it is determined in step S630 that there is a document which has been escaped, the process proceeds to step S630, where it is checked if a priority reading of the manually placed document has been completed, and if the reading has not been completed, the subroutine is completed. If it is determined in step S631 that the reading has not been completed, the process proceeds to step S632, where "currently transporting document" is set, a processing of starting a document transportation control of multi-document tray 501 is executed in S633, and the subroutine is completed. Thus, the document transportation from multi-document tray 501 is resumed.

If it is determined in step S630 that there is no document which has been escaped, it is confirmed in step S634 if there is a document transportation request. The document transport request is transmitted through the communication line from another CPU, and issued by pressing printing start key 106 after setting a document at multi-document tray 501. If there is no document transportation request in step S634, a processing of canceling "currently transporting document" is executed in step S635, a processing of stopping driving is executed in step S636, flag B is set to "0" in step S637, and then the subroutine is completed. If there is a document transportation request in step S634, the process proceeds to step S638, a process of starting a document transportation control from multi-document tray 501 is executed, "currently transporting document" is set in step S639, and then the subroutine is completed.

Figure 38:
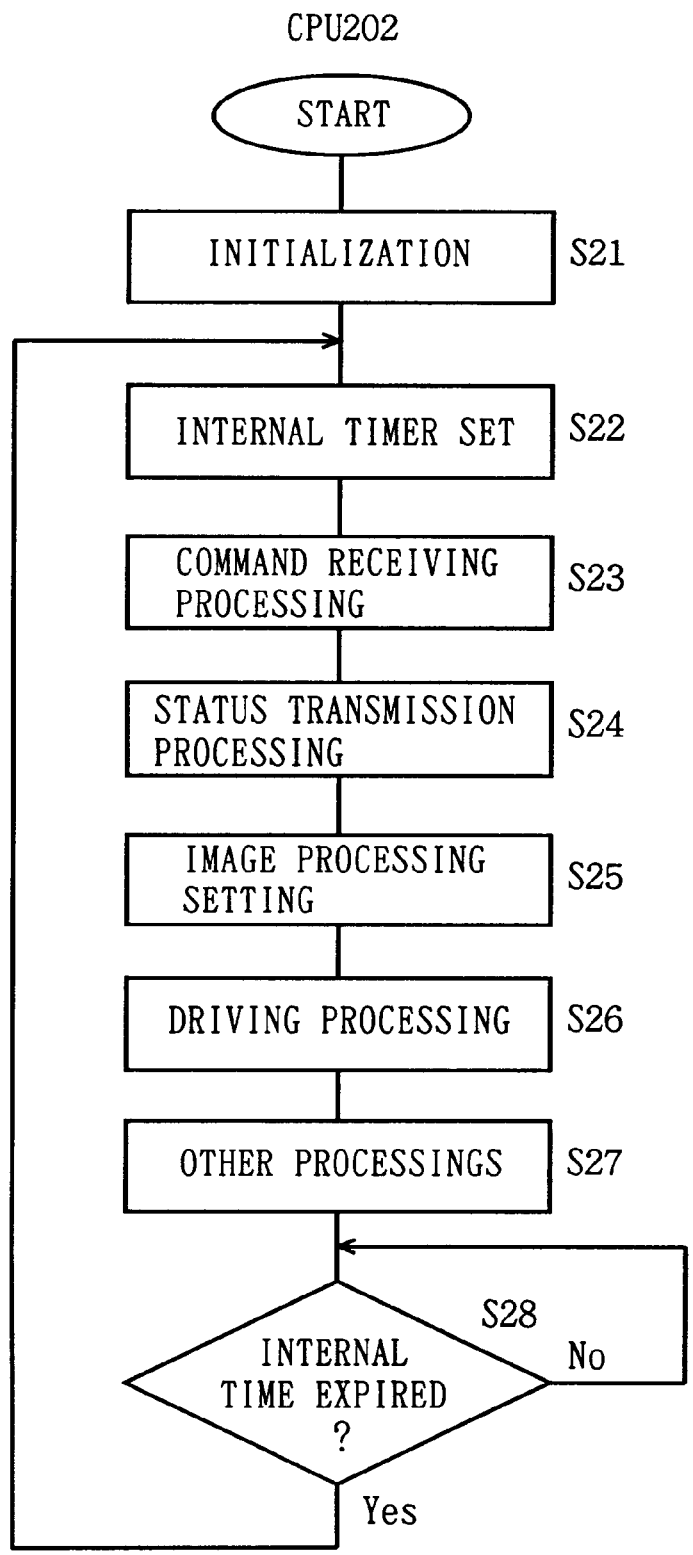
FIG. 38 is a main flow chart for use in illustration of the operation of CPU 202.

FIG. 38 is a main flow chart for use in illustration of the operation of the CPU 202 controlling each portion of image processing unit 20 and scanning system 10.

After initialization (step S21), CPU 202 repeatedly performs setting of the internal timer (step S22), a command receiving processing to check data from another CPU (step S23), a status transmission processing for transmitting states to another CPU (Step S24), a setting processing of various portions of image processing unit 20 (step S25), a driving control processing of scanning system 10 (step S26), other processings (S27) and waiting for the internal timer to expire (step S28). If "start of reading manually set document" is set in the processing of step S629 in FIG. 20, the request is accepted in the receiving processing in step S23, and used for controlling driving of scanning system 10 in step S26. If the reading of the manually placed document has been completed, the completion will be signaled to CPU 206 by the processing in step S24. Since the driving control of the scanning system is well known, a further description will not be provided thereon.

The main flow chart in FIG. 22 is used for illustration of the operation of CPU 203 controlling memory unit 30.

The main flow chart in FIG. 23 similarly shows the operation of CPU 205 governing the control of copying machine 1.

The flow chart in FIG. 24 is similarly used for illustration of the operation of the document reading processing in step S55 in FIG. 23.

If there is no document in step S501, it is determined if a reading is going on (step S507), if a reading is going, "document reading completed" is set in job registration completion management table MT1 (step S508), and "currently reading" is canceled (step S506).

The flow chart in FIG. 25 is used for illustrating the printing processing in step S56 in FIG. 23.

The digital copying machine according to the first to third embodiments have a mechanism of reading document images using linearly arranged CCDs, by transporting a document at a fixed speed. In this structure, a document must be transported to the image reading position from the same direction regardless of whether to read the front or back surface of the document. More specifically, if the front surface of the document is transported from one side to the document reading position while the back surface is transported from the other side, the directions of reading image data related to the front surface of the document and image data related to the back surface are opposite to each other, and one image data should be reversed with respect to the vertical scanning direction. Meanwhile, the reversing path can be a loop shaped path but the path requires a length for the length of a maximum size document which can be transported by the automatic document transport unit, which reduces the throughput when both sides of a small size document are read. Furthermore, since the path length for the length of the maximum size document which can be transported by the automatic document transport unit is necessary as the loop path, the machine will be increased in size.

Whether it is from the front surface or back surface of a document, there is provided a switch back path for reversing the document as described above as means for transferring the document to the image reading position from the same direction. However, the switch back path should be about as long as the document in the direction in which the document is transported, and time required for reversing the document depends on the size of the document corresponding to the vertical scanning direction. More specifically, it takes a relatively long time period to reverse a large size document. Therefore, the user sometimes must wait for an extremely long period of time to process a job to the next document following the presently processed the document group. Such a structure allowing an interrupt processing during executing a current job (before its completion) according to the first to third embodiments is very useful. As far as the interrupt processing executing the current job is concerned, the operation of transferring the document in the present job may be interrupted to execute an interrupting job. More specifically, by providing an interrupt key on the operation panel, the operation of transporting the document for the current job is stopped in response to the operation of the key, and thus the interrupt job may be executed. The document related to the current job may be removed from the transport path, then a document group not yet transported and placed at the document tray may be removed, and an interrupt job may be executed by placing a document for the interrupt job at the document tray. After the interrupt job is completed, document sheets which have not yet image-read among the document of the interrupt job may be placed at the document tray to resume the job. In this case, a tray particularly for the interrupt document is not necessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:

a first holder for holding a first document;

a second holder for holding a second document;

reading means for reading images of the first and second documents;

feeding means having a feeding path and a reversing path, for feeding, after a first side of the first document is read, the document in the reversing path, for reading a second side of the document; and a controller for controlling the feeding means and/or the reading means so that the second document is read while the first document is fed in the reversing path.

2. An image forming apparatus, comprising:

a first tray for holding a first document;

first feeding means for feeding the first document held by the first tray to a reading position;

second feeding means for feeding the first documents which is fed by the first feeding means and passed through the reading position, back to the first feeding means; and reading means for reading the first document passing through the reading position fed by the first feeding means, and for reading a second document, not held by the first tray, while the first document is fed by the second feeding means.

3. The image forming apparatus according to claim 2, further comprising:

a lamp directing light to a document, wherein said reading means reads the document by receiving the light directed from the lamp and reflected by the document.

4. The image forming apparatus according to claim 3, wherein said lamp directs light to the first document positioned at the reading position, moves in a reading area and directs light to the second document.

5. The image forming apparatus according to claim 4, wherein said reading area does not include the reading position.

6. The image forming apparatus according to claim 2, wherein the second document is stationary when read.

7. The image forming apparatus according to claim 2, further comprising:

a second tray for holding the second document, and third feeding means for feeding the second document held by the second tray to the reading position.

8. The image forming apparatus according to claim 7, wherein said reading means reads the second document passing through the reading position, fed by the third feeding means.

9. The image forming means according to claim 2, wherein said second feeding means continues feeding of the first document while the second document is read by the reading means.

10. An image forming apparatus, comprising:
   a tray for holding a first document;
   first feeding means for feeding the first document from the tray to a reading position;
   second feeding means for feeding the first document which has passed the reading position, back to the reading position;
   a platen glass for holding a second document; and
   reading means for reading a portion of the first document passing through the reading portion fed by the first feeding means, and reading an image of the second document held by the platen glass while the first document is fed by the second feeding means and the first document is not passing through the reading position.

11. An image forming apparatus, comprising:
   a first tray for holding a first document;
   a second tray for holding a second document;
   first feeding means for feeding the first document from the first tray to a reading position;
   second feeding means for feeding the first document which has passed through the reading position back to the reading position;
   third feeding means for feeding the second document from the second tray to the reading position; and
   reading means for reading a portion of the first document passing through the reading position fed by the first feeding means, and reading a portion of the second document passing through the reading position fed by the third feeding means, while the first document is fed by the second feeding means and the first document is not passing through the reading position.

* * * * *